United States Patent
Misaki

(10) Patent No.: US 9,280,013 B2
(45) Date of Patent: Mar. 8, 2016

(54) TOUCH PANEL CONFIGURED TO REDUCE EFFECTS OF MOISTURE, AND DISPLAY APPARATUS PROVIDED WITH TOUCH PANEL

(71) Applicant: Sharp Kabushiki Kaisha, Osaka (JP)

(72) Inventor: Katsunori Misaki, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 120 days.

(21) Appl. No.: 14/371,721

(22) PCT Filed: Jan. 9, 2013

(86) PCT No.: PCT/JP2013/050161
§ 371 (c)(1),
(2) Date: Jul. 10, 2014

(87) PCT Pub. No.: WO2013/105566
PCT Pub. Date: Jul. 18, 2013

(65) Prior Publication Data
US 2015/0042903 A1  Feb. 12, 2015

(51) Int. Cl.
*G06F 3/041* (2006.01)
*G02F 1/1333* (2006.01)
*G06F 3/044* (2006.01)

(52) U.S. Cl.
CPC ............ *G02F 1/13338* (2013.01); *G06F 3/044* (2013.01); *G06F 3/0412* (2013.01); *G02F 2001/133388* (2013.01); *G06F 2203/04103* (2013.01)

(58) Field of Classification Search
CPC .................. G02F 1/13338; G02F 2001/13388; G06F 3/04; G06F 2203/04103
See application file for complete search history.

(56) References Cited

U.S. PATENT DOCUMENTS

| | | | | |
|---|---|---|---|---|
| 8,698,776 | B2 * | 4/2014 | Kurashima | G06F 3/044 324/679 |
| 8,937,605 | B2 * | 1/2015 | Itakura | G06F 3/044 345/174 |
| 2008/0165139 | A1 * | 7/2008 | Hotelling | G06F 3/041 345/173 |
| 2009/0266621 | A1 | 10/2009 | Huang et al. | |
| 2010/0182267 | A1 * | 7/2010 | Lee | G06F 3/044 345/173 |
| 2010/0233930 | A1 * | 9/2010 | Ishida | G06F 3/0412 445/24 |
| 2011/0018560 | A1 * | 1/2011 | Kurashima | G06F 3/044 324/679 |
| 2011/0090159 | A1 * | 4/2011 | Kurashima | G06F 3/044 345/173 |
| 2011/0157762 | A1 * | 6/2011 | Kurashima | G06F 3/044 361/277 |
| 2011/0227867 | A1 * | 9/2011 | Ogawa | G06F 3/044 345/174 |

(Continued)

FOREIGN PATENT DOCUMENTS

JP  2011-90443 A  5/2011

*Primary Examiner* — Ryan A Lubit
(74) *Attorney, Agent, or Firm* — Chen Yoshimura LLP

(57) ABSTRACT

Provided is a highly reliable configuration of a one glass solution touch panel, in which a sensor electrode and a wiring line can be reliably connected to each other. A touch panel (1) is provided with: an insulating substrate (10) having a sensing area (V) and a non-sensing area (P); sensor electrodes (11, 12), which are formed in the sensing area (P); terminals (13), which are formed in the non-sensing area (P); wiring lines (14), which electrically connect the sensor electrodes (11, 12) and the terminals (13); a light-shielding layer (171), which is formed to cover the non-sensing area (P); and a planarizing film (172), which is formed to cover the light-shielding layer (171). The planarizing film (172) is formed only in the non-sensing area (P).

13 Claims, 25 Drawing Sheets

(56) References Cited

U.S. PATENT DOCUMENTS

| | | | |
|---|---|---|---|
| 2011/0316427 A1* | 12/2011 | Okajima | G06F 3/042 315/151 |
| 2012/0127094 A1* | 5/2012 | Jeong | G06F 3/044 345/173 |
| 2012/0139848 A1* | 6/2012 | Lee | G06F 3/044 345/173 |
| 2013/0038542 A1* | 2/2013 | Kim | G06F 3/041 345/173 |
| 2013/0154949 A1* | 6/2013 | Jamshidi Roudbari | G06F 3/041 345/173 |

* cited by examiner

TOUCH PANEL CONFIGURED TO REDUCE EFFECTS OF MOISTURE, AND DISPLAY APPARATUS PROVIDED WITH TOUCH PANEL

TECHNICAL FIELD

The present invention relates to a touch panel and a display device equipped with this touch panel, and more specifically refers to a one glass solution touch panel and a display device with this touch panel.

BACKGROUND ART

A touch panel is used while being bonded to a cover glass or cover film (hereinafter referred to as the "cover glass or the like"). When bonding together the touch panel and the cover glass or the like, there are cases in which air bubbles or foreign objects enter, which is a cause for decreased yield.

Conventional configurations for a one glass solution touch panel are known in which the rear surface of the cover glass (surface opposite to the operating surface) or the like has formed thereon sensor electrodes, thus forming the touch panel. In other words, in this configuration, the touch panel substrate is also the cover glass (cover film).

Japanese Patent Application Laid-Open Publication No. 2011-90443 discloses a projected capacitive touch panel characterized in that row electrodes that extend in one direction and row electrodes that extend in a second direction that intersects with the first direction are formed on a surface of one transparent substrate, and that in the periphery of the transparent substrate, a black mask portion (light-shielding layer) made of a material having light-shielding properties is formed.

The black mask portion is provided so as to cover from the viewer's side the lead-out wiring lines of the electrodes and the connecting portions for signal processing formed in the periphery of the transparent substrate, for example. A pigment-type color filter material is disclosed as the material for the black mask portion.

SUMMARY OF THE INVENTION

A configuration is known as described above in which a light-shielding layer is provided in the non-sensing area of the touch panel, the light-shielding layer overlapping the wiring lines and the like such that the wiring lines and the like are not visible to a user. However, if conductive films such as sensor electrodes and wiring lines straddle a region where the light-shielding layer is formed and a region where the light-shielding layer is not formed, there were cases in which the conductive film was disconnected due to the height difference caused by the light-shielding layer.

This is due to the fact that the light-shielding layer is formed so as to be relatively thick in order for it to exhibit light-shielding properties. Furthermore, the light-shielding layer is formed by mixing pigment into a negative-type resist. Thus, if the light-shielding layer is thick, the amount of light exposure in the pattern edge tends to be insufficient, which can make it difficult to form a forward taper in the light-shielding layer (tapering such that the light-shielding layer protrudes towards the direction opposite to the substrate).

Also, the surface roughness of the light-shielding layer depends on the diameter of the particles of the pigment (such as carbon). If the surface roughness of the light-shielding layer is great, then, it is not possible to form an even conductive film thereon.

One countermeasure is to form a planarizing film made of a transparent resin over the entire surface of the substrate so as to cover the light-shielding layer. However, sometimes, the planarizing film absorbs impurities such as moisture during the manufacturing process. Meanwhile, it is preferable that the sensor electrodes be formed as thinly as possible so as not to be seen by the user. There was a problem that if such thin sensor electrodes were formed on the planarizing film that contains moisture and the like, the resistance of the sensor electrodes would increase due to the moisture and the like.

An object of the present invention is to attain a highly reliably configuration in which it is possible to reliably connect the sensor electrodes and the wiring lines in the configuration of the one glass solution touch panel.

A touch panel disclosed herein includes: an insulating substrate having a sensing area and a non-sensing area; sensor electrodes formed in the sensing area; terminals formed in the non-sensing area; wiring lines that electrically connect the sensor electrodes to the terminals; a light-shielding layer formed so as to cover the non-sensing area; and a planarizing film covering the light-shielding layer, wherein the planarizing film is formed only in the non-sensing area.

According to the present invention, in the configuration of the one glass solution touch panel, it is possible to attain a configuration of highly reliable wiring lines with which it is possible to reliably connect the sensor electrodes and the wiring lines.

DETAILED DESCRIPTION OF EMBODIMENTS

Figure 1:
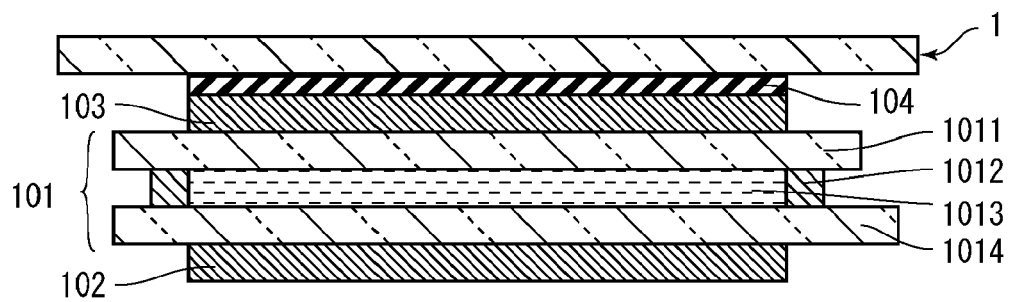
FIG. 1 is a cross-sectional view of a schematic configuration of a display device with a touch panel according to one embodiment of the present invention.

A touch panel according to an embodiment of the present invention includes: an insulating substrate having a sensing area and a non-sensing area; sensor electrodes formed in the sensing area of the insulating substrate; terminals formed in the non-sensing area of the insulating substrate; wiring lines that electrically connect the sensor electrodes to the terminals; a light-shielding layer formed in the non-sensing area; and a planarizing film covering the light-shielding layer the planarizing film being formed only in the non-sensing area of the insulating substrate and having a forward taper on an edge thereof adjacent to the sensing area. The terminals and the wiring lines are formed over the planarizing film, the wiring lines being formed at least in the non-sensing area (first configuration).

According to the configuration above, the planarizing film is formed so as to cover the light-shielding layer. In general, it is difficult to form a forward taper in light-shielding layers. Also, the light-shielding layer sometimes has a high degree of surface roughness. By forming a planarizing film so as to cover the light-shielding layer, the sensor electrodes and wiring lines can be made so as to be difficult to disconnected, even if they straddle the sensing area and the non-sensing area. Also, it is possible to form the sensing electrodes and wiring lines evenly by reducing surface roughness.

The planarizing film is formed only in the non-sensing area. Thus, the sensing electrodes forming in the sensing region are unaffected by moisture and the like absorbed by the planarizing film.

In the first configuration, it is preferable that a first insulating film formed so as to overlap the wiring lines in a plan view be further included (second configuration).

In the second configuration, the wiring lines can be formed in a layer below the first insulating film (third configuration).

In the second configuration, the wiring lines can be formed in a layer above the first insulating film (fourth configuration).

In any of the second to fourth configurations, it is possible to have a configuration in which the sensor electrodes include a first electrode and a second electrode, in which the first electrode includes a plurality of first island-shaped electrodes disposed along a first direction and a first connecting portion that connects the adjacent first island-shaped electrodes, in which the second electrode includes a plurality of second island-shaped electrodes disposed along a second direction that intersects with the first direction, and a second connecting portion that connects the adjacent second island-shaped electrodes, and in which the touch panel further includes a second insulating film that insulates the first electrode from the second electrode (fifth configuration).

In the fifth configuration, it is possible to have a configuration in which the second insulating film has openings, and in which the second island-shaped electrodes and the second connecting portion are connected through the openings.

In any of the first to sixth configurations, it is possible to have a configuration in which the wiring lines straddle the sensing area and the non-sensing area (seventh configuration).

According to this configuration, the wiring lines can straddle the sensing area and the non-sensing area. It is preferable that the sensor electrodes be formed thin so as to be difficult to see by a user. On the other hand, the wiring lines can be formed relatively thick. Thus, it is possible to make it difficult to have disconnections even in the boundary between the sensing area and the non-sensing area.

In the fifth or sixth configuration, it is possible to have a configuration that further includes third connecting portions that connect the sensor electrodes to the wiring lines, the third connecting portions being made of the same material as the second connecting portion (eighth configuration).

In the eighth configuration, it is possible to have a configuration in which the second connecting portion is formed over the second insulating film, and in which the third connecting portions are formed over the first insulating film (ninth configuration).

In the eighth or ninth configuration, it is possible to have a configuration in which the second connecting portion and the third connecting portions are formed in the same step (tenth configuration).

According to this configuration, the manufacturing process can be simplified.

In any of the eighth to tenth configurations, it is preferable that the second connecting portion and the third connecting portions be formed so as to be thicker than the first island-shaped electrodes and the second island-shaped electrodes (eleventh configuration).

It is preferable that the first island-shaped electrode and the second island-shaped electrode be formed thin so as to be difficult to see by a user. Meanwhile, by forming the second connecting portion and the third connecting portion relatively thick, the reliability is increased. In particular, by forming the third connecting portion thick, it is possible to prevent disconnection even at the boundary between the sensing area and the non-sensing area.

In any of the first to eleventh configurations, it is preferable that the terminals be formed so as to overlap the wiring lines in a plan view in the non-sensing area.

According to this configuration, by having a redundant structure between the wiring lines and the terminals, it is possible to reduce electrical resistance. Also, even if one of those disconnects, conduction can be maintained, and thus, a configuration with a high reliability is attained.

A touch panel-equipped display device according to an embodiment of the present invention includes: a liquid crystal display device; and the touch panel according to any one of claims 1 to 12 (first configuration of touch panel-equipped display device).

Embodiments

Embodiments of the present invention will be described in detail below with reference to the drawings. Portions in the drawings that are the same or similar are assigned the same reference characters and descriptions thereof will not be repeated. For ease of description, drawings referred to below show simplified or schematic configurations, and some of the components are omitted. Components shown in the drawings are not necessarily to scale.

<Overall Configuration>

FIG. 1 is a cross-sectional view of a schematic configuration of a display device 100 with a touch panel according to one embodiment of the present invention. The display device 100 with a touch panel includes a touch panel 1, a liquid crystal display device 101, polarizing plates 102 and 103, and an adhesive material 104.

The polarizing plates 102 and 103 are disposed on the main front and rear surfaces of the liquid crystal display device 101. The touch panel 1 is bonded onto the polarizing plate 103 by the adhesive material 104.

Although the configuration will be described in further detail later, the touch panel 1 has sensor electrodes on the surface facing the liquid crystal display device 101. The sensor electrodes form capacitance with a finger or the like that has approached the touch panel 1. The touch panel 1 determines the position of the finger or the like based on changes in this capacitance.

A light-shielding layer is formed in the periphery of the touch panel 1. The light-shielding layer can hide portions that are preferably not seen by the user. Portions that are preferably not seen by the user include wiring lines and terminals in the touch panel 1 and terminals and the like in the liquid crystal display device 101, for example.

The liquid crystal display device 101 includes a color filter substrate 1011, a thin film transistor (TFT) substrate 1014, a sealing member 1012, and liquid crystal 1013. The color filter substrate 1011 and the TFT substrate 1014 are disposed so as to face each other. The sealing member 1012 is formed in the periphery of the color filter substrate 1011 and the TFT substrate 1014, and the liquid crystal 1013 is sealed in the inner side of the sealing member 1012.

The TFT substrate 1014 is formed at a slightly larger area than the color filter substrate 1011. Terminals and the like that are not shown are formed in the region of the TFT substrate 1014 that protrudes when facing the color filter substrate 1011. The terminals are connected to a driver circuit that is not shown, the touch panel 1, and the like through a flexible printed circuit board (FPC) or the like.

The TFT substrate 1014 includes pixel electrodes and TFTs that are not shown. The pixel electrodes and TFTs are arranged in a matrix. The TFTs can be made of a material that includes amorphous silicon or indium gallium zinc oxide (IGZO), but it is preferable that IGZO, which has a high electron mobility, be used.

The color filter substrate 1011 includes color filters and a common electrode that are not shown. The color filters are formed in a regular fashion so as to face the respective pixel electrodes of the TFT substrate 1014. The common electrode is formed over almost the entire surface of the TFT substrate 1014.

In the liquid crystal display device 101, an electric field is generated between specific pixel electrodes and the common electrode by driving the TFTs on the TFT substrate 1014. The orientation of the liquid crystal 1013 is changed by this electric field. Light that enters from the polarizing plate 102 side is polarized in a specific direction by the polarizing plate 102. The polarizing direction of the light that has entered the liquid crystal 1013 is changed depending on the orientation of the liquid crystal 1013. Only the light polarized in a specific direction passes through the polarizing plate 103.

In this manner, in the liquid crystal display device 101, it is possible to control whether light passes or does not pass through specific pixel electrodes. Light that has passed through the pixel electrodes is colored by the color filters. By disposing color filters of a plurality of colors such as red, green, and blue in a regular fashion, it is possible to display various colors by additive color mixing.

The schematic configuration of the display device 100 with the touch panel was described above. In the display device 100 with the touch panel, the substrate of the touch panel 1 is also the cover glass. In other words, there is no need to additionally bond a cover glass or the like on the touch panel 1. As a result, the manufacturing process can be simplified.

Also, it is possible to avoid a decrease in yield resulting from air bubbles and foreign matter entering if the touch panel 1 and a cover glass or the like were to be bonded together. In addition, by removing a member such as a cover glass, it is possible to thin the touch panel 1 and improve light transmission.

Figure 2:
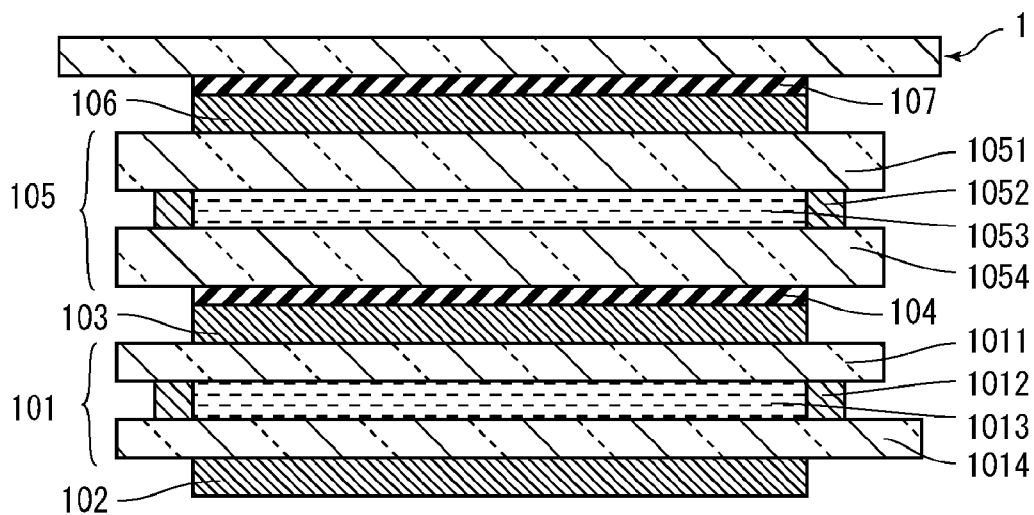
FIG. 2 is a cross-sectional view of a schematic configuration of a display device with a touch panel according to another embodiment of the present invention.

FIG. 2 is a cross-sectional view of a schematic configuration of a display device 200 with a touch panel according to another embodiment of the present invention. The display device 200 with the touch panel includes, in addition to the configuration of the display device 100 with the touch panel, a switch liquid crystal panel 105, a polarizing plate 106, and an adhesive material 107.

The switch liquid crystal panel 105 is bonded onto the polarizing plate 102 through the adhesive material 104. The polarizing plate 106 is disposed on the front surface of the switch liquid crystal panel 105. The touch panel 1 is bonded onto the front surface of the polarizing plate 106 by the adhesive material 107.

The switch liquid crystal panel 105 includes a control substrate 1051, an opposite substrate 1054, a sealing member 1052, and liquid crystal 1053. The control substrate 1051 and the opposite substrate 1054 are disposed facing each other. The sealing member 1052 is formed in the periphery of the control substrate 1051 and the opposite substrate 1054, with liquid crystal 1053 being sealed in the inner side of the sealing member 1052.

The control substrate 1051 includes control electrodes that are not shown. The control electrodes are disposed in a regular fashion on the control substrate 1051. The opposite substrate 1054 includes a common electrode that is not shown. The common electrode is formed over almost the entire surface of the opposite substrate 1054. In the switch liquid crystal panel 105, an electric field is formed between specific control electrodes and the common electrode, thus changing the orientation of the liquid crystal 1053.

The switch liquid crystal panel 105 can be switched between two dimensional display mode and three dimensional display mode in the following manner.

In two dimensional display mode, the liquid crystal 1053 of the switch liquid crystal panel 105 is oriented evenly. Thus, images displayed by the liquid crystal display device 101 are displayed as is.

In three dimensional display mode, the switch liquid crystal panel 105 changes the orientation of the liquid crystal 1053 in a regular fashion. The liquid crystal 1053 functions as a lens due to the difference in index of refraction resulting from the change in orientation. In response to this, images shot from multiple directions are aligned in a regular fashion as they are displayed in the liquid crystal display device 101. Then, these images are separated by the liquid crystal 1053. If the display device 200 with a touch panel is viewed from an optimal position, different image reach the left and right eyes. In other words, the display device 200 with a touch panel performs a so-called parallax three dimensional display during three dimensional display mode.

The schematic configuration of the display device 200 with the touch panel was described above. In the display device 200 with the touch panel also, the substrate of the touch panel 1 is also the cover glass.

<Configuration of Touch Panel>

Figure 3:
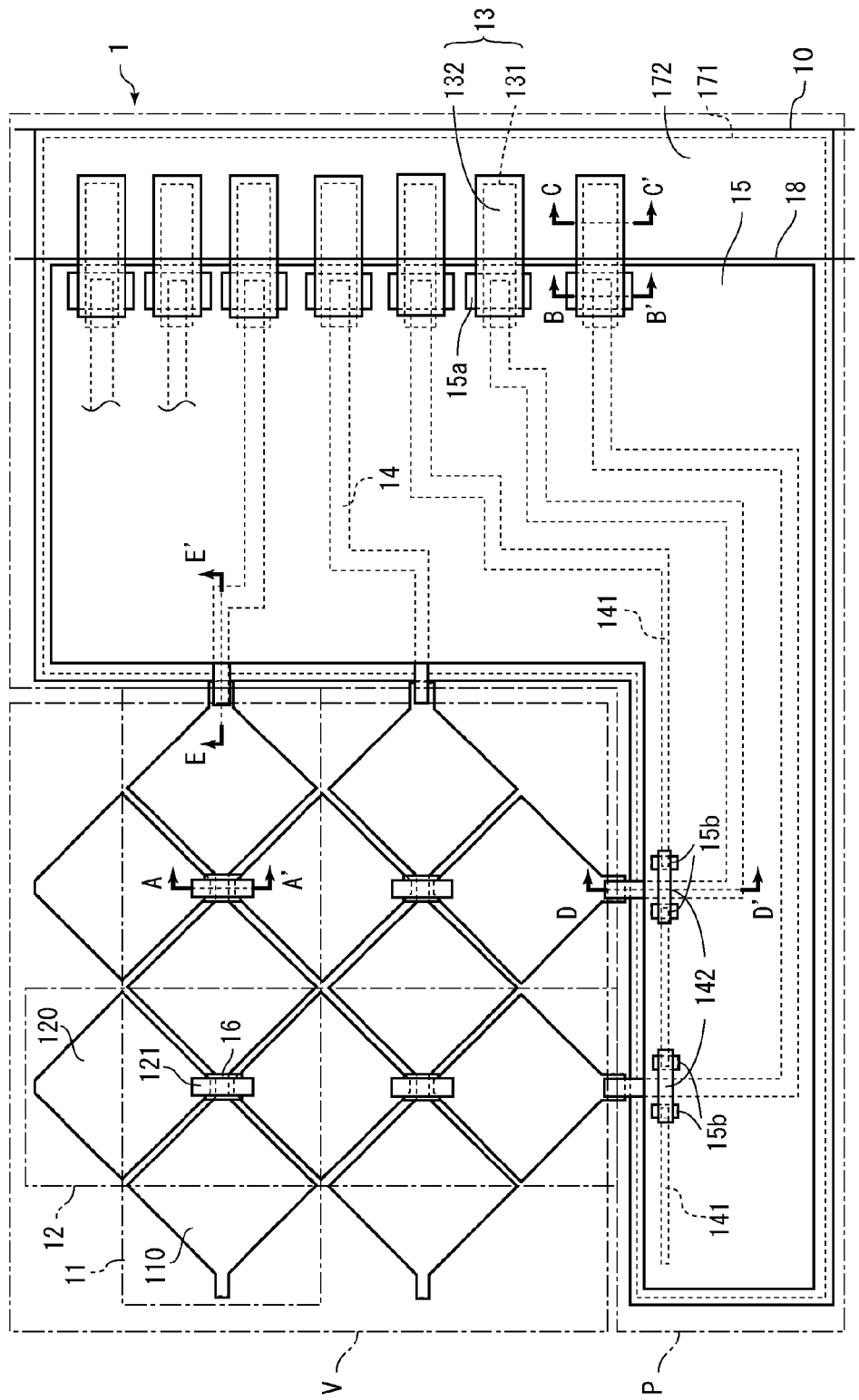
FIG. 3 is a plan view that shows a schematic configuration of a touch panel according to Embodiment 1 of the present invention.
Figure 4:
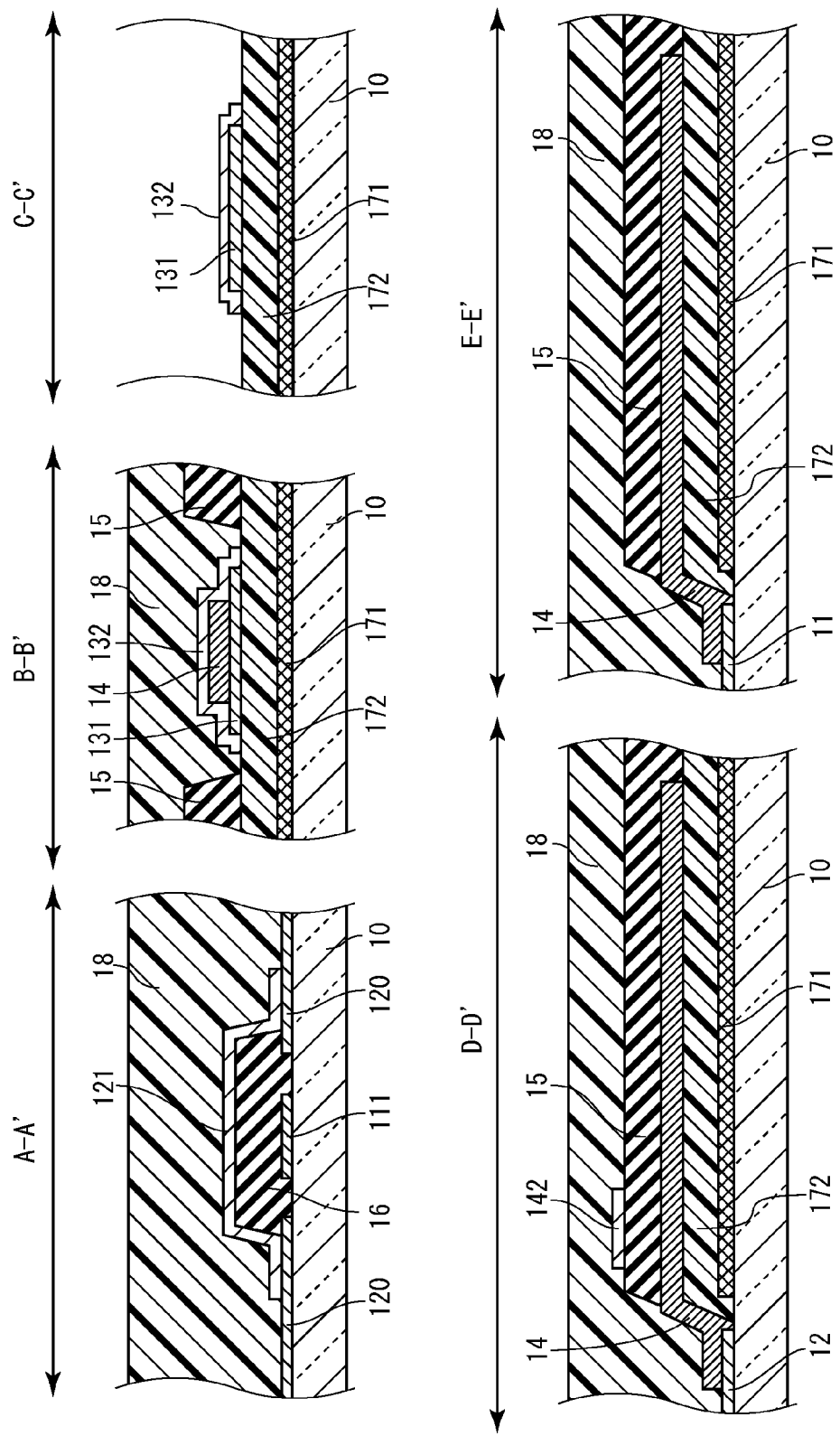
FIG. 4 shows cross-sectional views of FIG. 3 along the lines A-A', B-B', C-C', D-D', and E-E', respectively.

The configuration of the touch panel 1 will be described in detail below. FIG. 3 is a plan view that shows a schematic configuration of a touch panel 1 according to Embodiment 1 of the present invention. FIG. 4 shows cross-sectional views of FIG. 3 along the lines A-A', B-B', C-C', D-D', and E-E', respectively. The touch panel 1 includes a substrate 10, X electrodes 11, Y electrodes 12, terminals 13, wiring lines 14, a ground wiring line 141, bridge wiring lines 142, insulating films 15 and 16, a light-shielding layer 171, a planarizing film 172, and a protective film 18.

The X electrodes 11, the Y electrodes 12, the terminals 13, the wiring lines 14, the ground wiring line 141, the bridge wiring lines 142, the insulating films 15 and 16, the light-shielding layer 171, the planarizing film 172, and the protective film 18 are formed on one surface of the substrate 10. In the display device 100 with the touch panel, this surface faces the liquid crystal display device 101.

The touch panel 1 has a sensing area V and a non-sensing area P. The sensing area V is a region where a finger or the like is detected when it comes into contact with the touch panel 1. In other words, the region where the sensor electrodes (X electrodes 11 and Y electrodes 12) are formed is the sensing area. In FIG. 3, the rectangular region surrounding the X electrodes 11 and the Y electrodes 12 is defined as the sensing area V. The sensing area V may have an appropriate shape that is not limited to a rectangular shape. Alternatively, the sensing area V may be a non-continuous region. The sensing area V corresponds in position to the display region of the liquid crystal display device 101. According to this configuration, it is possible for the user to enter commands in positions corresponding to images displayed in the liquid crystal display device 101.

In FIG. 3, the non-sensing area P is disposed to the right and below the sensing area V. However, the arrangement of the non-sensing area P can be appropriately chosen. For example, the non-sensing area P may surround the sensing area V on all four sides. Alternatively, the non-sensing area P may be disposed on only one side of the sensing area V.

Figure 5:
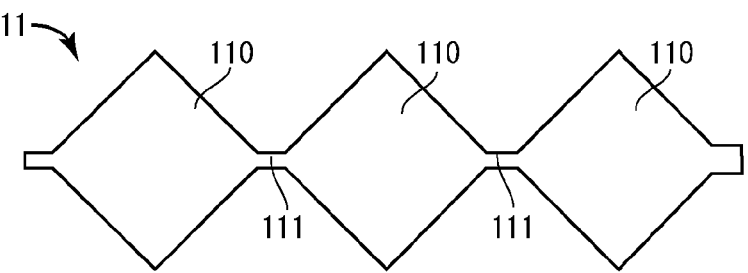
FIG. 5 is a drawing that shows a view of only an X electrode in the touch panel according to Embodiment 1 of the present invention.

FIG. 5 shows only the X electrode 11 of the touch panel 1. The X electrode 11 includes a plurality of island-shaped electrodes 110 disposed along one direction, and connecting portions 111 that connect adjacent island-shaped electrodes 110. The island-shaped electrodes 110 and the connecting portions 111 are integrally connected to each other.

As shown in FIG. 3, the Y electrodes 12 include a plurality of island-shaped electrodes 120 disposed along a direction that intersects the X electrodes 11, and connecting portions 121 that connected adjacent island-shaped electrodes 120.

Insulating films 16 are formed in portions where the X electrodes 11 and the Y electrodes 12 intersect. As shown in FIG. 4, the connecting portion 121 connects adjacent island-shaped electrodes 120 over the insulating film 16. The X electrodes 11 and the Y electrodes 12 are insulated from each other by this configuration.

As shown in FIG. 3, the non-sensing area P has formed therein the light-shielding layer 171, the planarizing film 172, the terminals 13, the wiring lines 14, and the like.

The light-shielding layer 171 is formed over the entire non-sensing area P. In the present embodiment, the light-shielding layer 171 is formed directly on the substrate 10. The light-shielding layer 171 allows components formed in layers above the light-shielding layer 171 to not be seen by a user.

The planarizing film 172 is formed so as to cover the light-shielding layer 171. The planarizing film 172 is formed only in the non-sensing area P and is not formed in the sensing area V.

The terminals 13 are formed in the vicinity of an edge of the substrate 10. The X electrodes 11 and Y electrodes 12 are electrically connected to the terminals 13 through the wiring lines 14.

As shown in FIGS. 3 and 4, the wiring lines 14 are formed so as to straddle the sensing area V and the non-sensing area P, and are in contact with the X electrodes 11 or the Y electrodes 12.

The ground wiring line 141 is connected to neither the X electrodes 11 nor the Y electrodes 12. The ground wiring line 141 functions as a shielding line that blocks electromagnetic noise.

The wiring lines 14 and the ground wiring line 141 are covered by the insulating film 15. The insulating film 15 also has contact holes 15a and 15b formed therein.

The terminal 13 has a two layer structure including a lower terminal layer 131 and an upper terminal layer 132. The lower terminal layer 131 is formed below the insulating film 15 and the upper terminal layer 132 is formed above the insulating film 15. The lower terminal layer 131, the upper terminal layer 132, and the wiring line 14 are in contact with each other through the contact hole 15a formed in the insulating film 15. As shown in the cross-sectional view along the line B-B' in FIG. 4, the lower terminal layer 131 and the upper terminal layer 132 sandwich the wiring line 14.

The bridge wiring lines 142 are formed where the wiring lines 14 intersect with the ground wiring line 141. The bridge wiring lines 142 are formed on the insulating film 15. The ground wiring line 141 and the bridge wiring lines 142 are in contact with each other through the contact holes 15b formed in the insulating film 15. As a result, the wiring lines 14 and the ground wiring line 141 are not in contact with each other.

The protective film 18 is formed so as to cover almost the entire surface of the substrate 10. Portions of the terminals 13 are exposed without being covered by the insulating film 15 or the protective film 18. The exposed portions of the terminals 13 are connected to the driver circuit through the FPC or the like.

<Method of Manufacturing Touch Panel 1>

A method of manufacturing the touch panel 1 will be described below with reference to FIGS. 6A to 6G. FIGS. 6A to 6G show cross-sectional views of FIG. 3 along the lines A-A', B-B', C-C', D-D', and E-E', respectively.

Figure 6A:
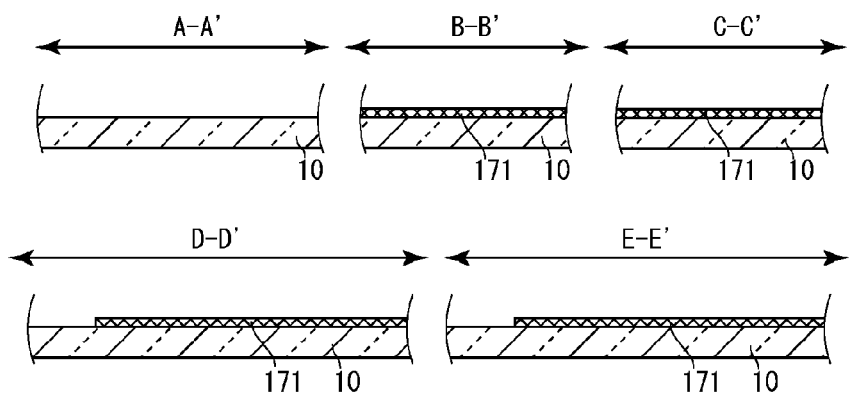
FIG. 6A shows cross-sectional views for describing a method of manufacturing the touch panel according to Embodiment 1 of the present invention.

As shown in FIG. 6A, a light-shielding layer 171 is formed on the substrate 10. The substrate 10 is a glass substrate, for example.

The light-shielding layer 171 can be made of a low-reflection metal such as chromium or of a black resin, but it is preferable that the light-shielding layer 171 be made of black resin. The black resin is an acrylic resin, a novolac resin, or the like with black pigment dispersed therein, for example.

The light-shielding layer 171 is formed by a printing method such as screen printing or flexo printing, patterning by photolithography, or the like, for example.

Figure 6B:
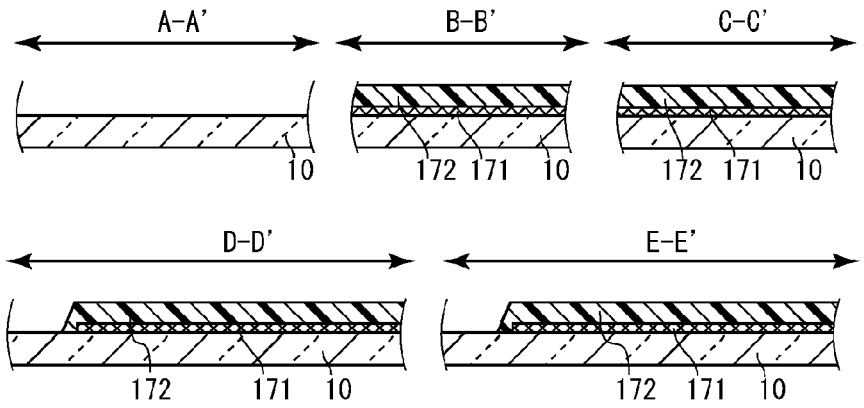
FIG. 6B shows cross-sectional views for describing the method of manufacturing the touch panel according to Embodiment 1 of the present invention.

Next, as shown in FIG. 6B, the planarizing film 172 is formed so as to cover the light-shielding layer 171. The planarizing film can be made of a photoresist with the main component thereof being an acrylic resin, a novolac resin, an epoxy resin, an alkyl resin, a phenol resin, a silicon resin, or the like.

Photoresist is evenly coated onto the entire surface of the substrate 10 by a spin coater or a slit coater. There is no special limitation on the thickness of the photoresist as long as it is thicker than the light-shielding layer, but the thickness of the photoresist is 1.5 to 3.5 µm, for example. The photoresist film formed on the entire surface of the substrate 10 is patterned by photolithography, thus forming the planarizing film 172. As shown in FIG. 3, the planarizing film 172 is not formed in the sensing area V.

As shown in the cross-sectional views along the line D-D' and the line E-E', it is preferable that the edge of the planarizing film 172 have a forward taper (tapered so as to protrude towards the direction opposite to the substrate 10). This is due to the fact that when forming a conductive film on the planarizing film 172, it is more difficult for disconnections to occur in the conductive film with the forward taper compared to a case in which the planarizing film 172 is formed with a perpendicular edge or a reverse taper (tapered so as to protrude towards the substrate 10). The forward tape can be formed by using a photomask in which the light transmission changes gradually, for example, and then performing exposure.

Figure 6C:
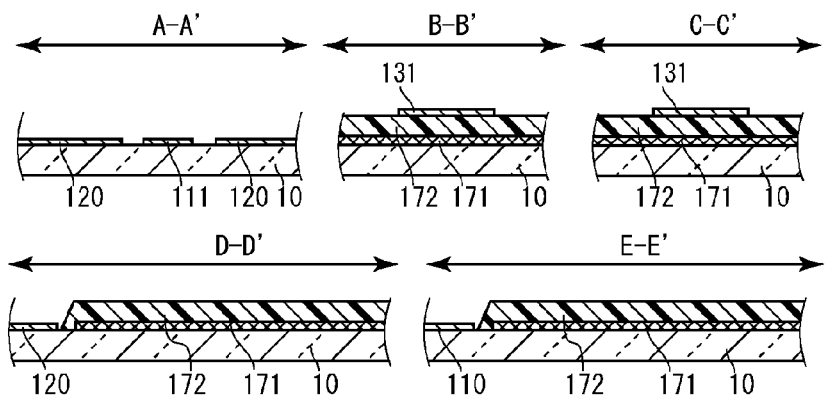
FIG. 6C shows cross-sectional views for describing the method of manufacturing the touch panel according to Embodiment 1 of the present invention.

As shown in FIG. 6C, the island-shaped electrodes 110 of the X electrodes 11, the connecting portions 111, the island-shaped electrodes 120 of the Y electrodes 12, and the lower terminal layer 131 of the terminals 13 are formed.

First, an even transparent conductive film is formed by sputtering or CVD (chemical vapor deposition) so as to cover the substrate 10 and the planarizing film 172. The transparent conductive film is ITO (indium tin oxide) or IZO (indium zinc oxide), for example. There is no special limitation on the thickness of the transparent conductive film, but it is 10 nm to 50 nm, for example.

The transparent conductive film, after being formed, is patterned by photolithography. Specifically, masks made of photoresist are formed in portions where the island-shaped electrodes 110 and 120, the connecting portions 111, and the lower terminal layer 131 are to be formed. The remaining portions are then removed by etching. The etching method can be chosen as appropriate, but may employ the use of oxalic acid or a mixture of phosphoric acid, acetic acid, and nitric acid, or the like, for example.

After patterning is completed, annealing is performed at a temperature of 200 to 250° C. During annealing, the transparent conductive films (island-shaped electrodes 110 and 120, connecting portion 111, and lower terminal layer 131) that were amorphous become polycrystalline.

Figure 6D:
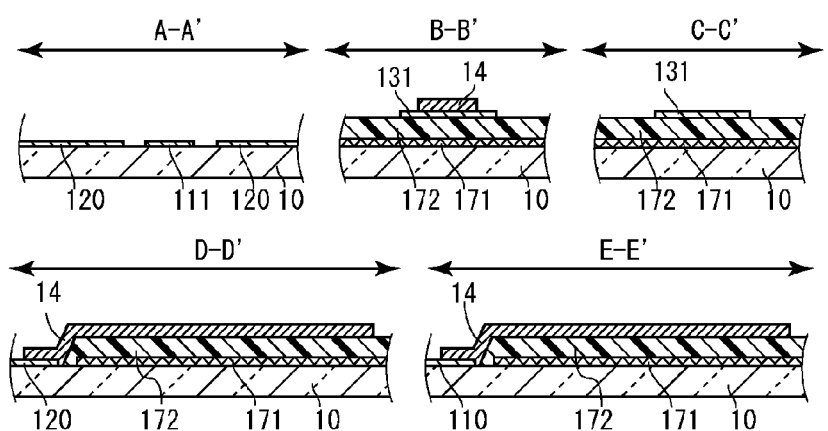
FIG. 6D shows cross-sectional views for describing the method of manufacturing the touch panel according to Embodiment 1 of the present invention.

Next, as shown in FIG. 6D, wiring lines 14 are formed. Although not shown in FIG. 6D, the ground wiring line 141 (refer to FIG. 3) is also formed at the same time.

First, an even metal film is formed so as to cover the entire surface of the substrate 10 by sputtering or vapor deposition. It is preferable that the metal film be low resistance, and the metal film is made of Al, for example. However, Al is susceptible to corrosion by alkalis, and if Al and a conductive oxide film such as ITO come into direct contact, this results in galvanic corrosion due to differences in ionization tendency. Thus, it is preferable that a layered structure with a metal with high resistance to corrosion be used. Thus, a suitable metal film is a multilayer film of MoNb/Al/MoNb, a multilayer film of MoN/Al/MoN, a multilayer film of Mo/Al/Mo, or the like, for example.

It is preferable that the metal film be thick in order to reduce resistance. As shown in the cross-sectional views along the line D-D' and the line E-E', the greater the thickness of the metal film is, the more difficult it is for a disconnection to occur in the boundary between where the planarizing film 172 is present and where the planarizing film 172 is not present. The thickness of the metal film is 0.3 to 1.0 µm, for example.

The metal film, after being formed, is patterned by photolithography. Specifically, masks made of photoresist are formed over portions where the wiring lines 14 and the ground wiring line 141 are to be formed. The remaining portions are then removed by etching. The etching method can be chosen as appropriate, but it is possible to use a mixed acid including phosphoric acid, acetic acid, and nitric acid, or the like, for example.

Figure 6E:
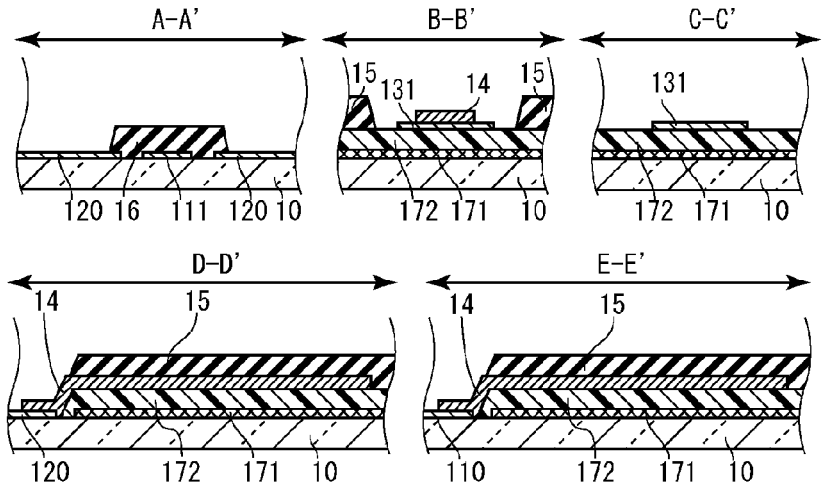
FIG. 6E shows cross-sectional views for describing the method of manufacturing the touch panel according to Embodiment 1 of the present invention.

Next, as shown in FIG. 6E, the insulating films 15 and 16 are formed. An organic insulator or an inorganic insulator may be used for the insulating films 15 and 16.

A case will be described in which the insulating films 15 and 16 are made of an organic insulator. The organic insulator is a photoresist including an acrylic resin, a novolac resin, or the like, for example. Photoresist is evenly coated onto the entire surface of the substrate 10 by a spin coater or a slit coater. The insulating film 15 protects the wiring lines 14 and the ground wiring line 141 from moisture, chemicals, and the like during the manufacturing process. Thus, it is preferable that the insulating film 15 be thicker. There is no special limitation on the thickness of the photoresist, but it is 1.5 to 3.0 μm, for example.

The photoresist formed on the entire surface of the substrate 10 is patterned by photolithography, thus forming the insulating films 15 and 16. At this time, the contact holes 15a and 15b are also formed.

A case will be described in which the insulating films 15 and 16 are made of an inorganic insulator. The inorganic insulator is SiN, $SiO_2$, SiON, or the like, for example. An even inorganic film made of these materials is formed by CVD on the entire surface of the substrate 10. Even in this case, it is preferable that the inorganic film be thicker, and it is preferable that the inorganic film be twice or more times the thickness of the wiring lines 14 and the ground wiring line 141.

The inorganic film formed over the entire surface of the substrate 10 is patterned by photolithography. Specifically, masks made of photoresist are formed in portions where the insulating films 15 and 16 are to be formed. The remaining portions are then removed by etching. At this time, the contact holes 15a and 15b are also formed. Any etching method may be chosen, but it is possible to use dry etching using a fluorine-based gas, for example.

Whether or organic insulator or an inorganic insulator is used, it is preferable that the edge of the insulating film 16 have a forward taper. If an organic insulator is used for the insulating film 16, the forward taper can be formed by exposure through a photomask having a gradual change in light transmission. If an inorganic insulator is used for the insulating film 16, the forward taper can be formed by adjusting the etching condition or by layering inorganic films (by repeatedly forming a film and etching).

Figure 6F:
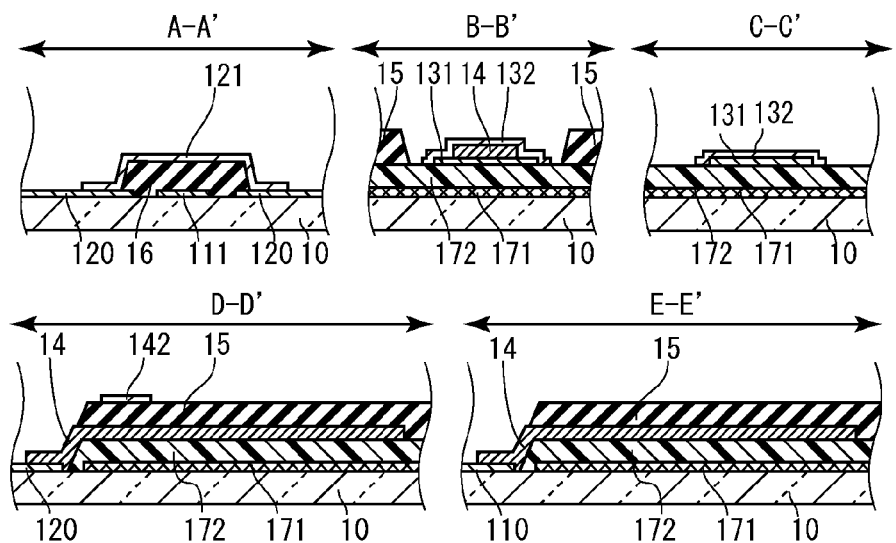
FIG. 6F shows cross-sectional views for describing the method of manufacturing the touch panel according to Embodiment 1 of the present invention.

As shown in FIG. 6F, the connecting portions 121 of the Y electrodes 12, the upper terminal layer 132 of the terminals 13, and the bridge wiring lines 142 are formed. An even transparent conductive film is formed on the entire surface of the insulating substrate 10 by sputtering or CVD. The transparent conductive film is ITO or IZO, for example. There is no special limitation on the thickness of the transparent conductive film, but it is 10 nm to 50 nm, for example.

The transparent conductive film, after being formed, is patterned by photolithography. Specifically, masks made of photoresist are formed in portions where the connecting portions 121, the upper terminal layer 132, and the bridge wiring lines 142 are to be formed. The remaining portions are then removed by etching. The etching method can be chosen as appropriate, but can employ the use of oxalic acid, a mixture of phosphoric acid, acetic acid, and nitric acid, or the like, for example.

After patterning is completed, annealing may be performed in order to polycrystallize the connecting portions 121, the upper terminal layer 132, and the bridge wiring lines 142.

Figure 6G:
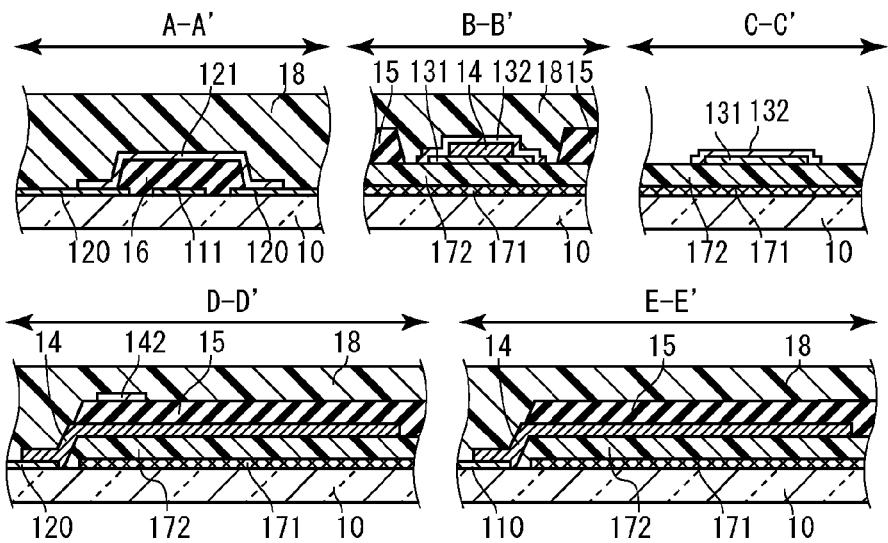
FIG. 6G shows cross-sectional views for describing the method of manufacturing the touch panel according to Embodiment 1 of the present invention.

Lastly, as shown in FIG. 6G, the protective film 18 is formed so as to cover almost the entire surface of the substrate 10. The protective film 18 is an acrylic resin, for example. An even film is formed by a spin coater or a slit coater over almost the entire surface of the substrate 10. At this time, a metal mask or the like is used to expose portions of the terminals 13. There is no special limitation on the thickness of the protective film 18, but it is 1.5 to 3.0 μm, for example.

The configuration of the touch panel 1 and the manufacturing method according to Embodiment 1 of the present invention have been described above.

According to the configuration of the touch panel 1 of the present embodiment, the planarizing film 172 is formed covering the light-shielding layer 171. It is difficult to create a forward taper in the light-shielding layer 171. On the other hand, it is relatively easy to form a forward taper in the planarizing film 172. By covering the light-shielding layer 171 with the planarizing film 172, it is possible to make it difficult for the wiring lines 14 to be disconnected at the boundary between the sensing area V and the non-sensing area P.

Also, the surface roughness of the light-shielding layer 171 depends on the diameter of the particles in the pigment. If the surface roughness of the light-shielding layer 171 is great, then it is difficult to form an even film over the light-shielding layer 171. On the other hand, the planarizing film 172 can be formed with a smooth surface. In the present embodiment, by covering the light-shielding layer 171 with the planarizing film 172 and forming the wiring lines 14 over the planarizing film 172, it is possible to form the wiring lines 14 as an even film.

In the present embodiment, the planarizing film 172 is not formed in the sensing area V. Thus, the X electrodes 11 and the Y electrodes 12 are unaffected by moisture and the like absorbed by the planarizing film 172.

In the present embodiment, the wiring lines 14 are formed so as to straddle the sensing area V and the non-sensing area P. As a result, the X electrodes 11 and Y electrodes 12 are connected to the wiring lines 14. It is preferable that the X electrodes 11 and the Y electrodes 12 be formed thin so as to be difficult to see by the user. On the other hand, the wiring lines 14 can be formed relatively thick. Thus, it is possible to have a configuration in which the wiring lines 14 are not susceptible to disconnection at the boundary between the sensing area V and the non-sensing area P.

In the present embodiment, the terminal 13 has a two layer structure including a lower terminal layer 131 and an upper terminal layer 132. As a result, it is possible to increase the cross-sectional area of the terminals 13, which makes it possible to lower the resistance of the terminals 13.

The surfaces of the wiring lines 14 sometimes experience a change in characteristics during the manufacturing process due to oxidation or the like. Thus, if the conductive film is formed on the upper surface of the wiring lines 14, there are cases in which the contact resistance is high. In the present embodiment, the lower terminal layer 131 and the upper terminal layer 132 sandwich each wiring line 14. As a result, even if the contact resistance between the wiring line 14 and the upper terminal layer 132 is high, by having the wiring line 14, the lower terminal layer 131, and the upper terminal layer 132 in contact with each other, it is possible to reduce contact resistance.

Comparison Example 1

Figure 7:
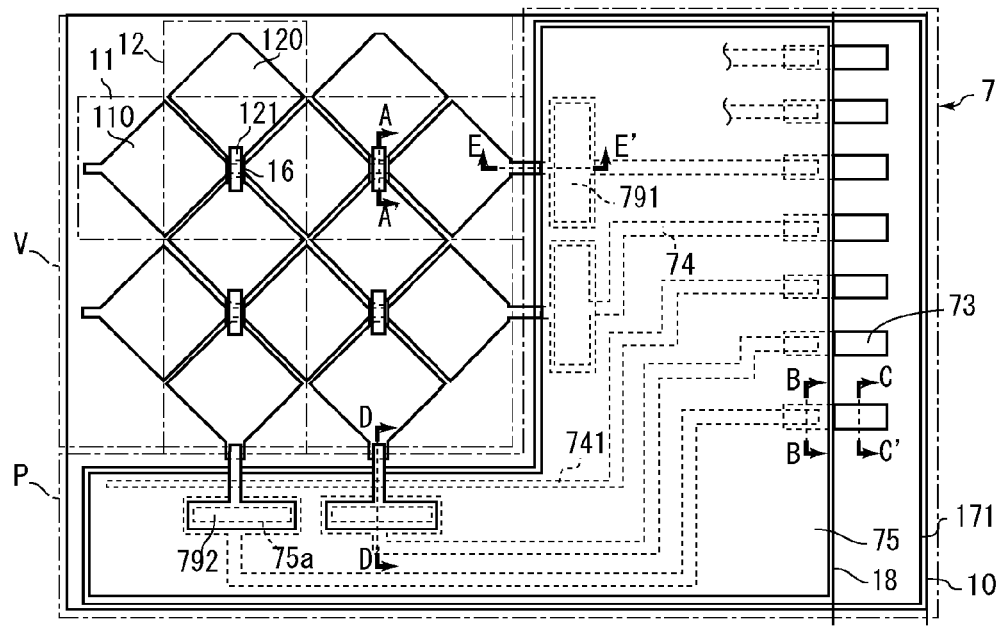
FIG. 7 is a plan view that shows a schematic configuration of a touch panel according to Comparison Example 1.
Figure 8:
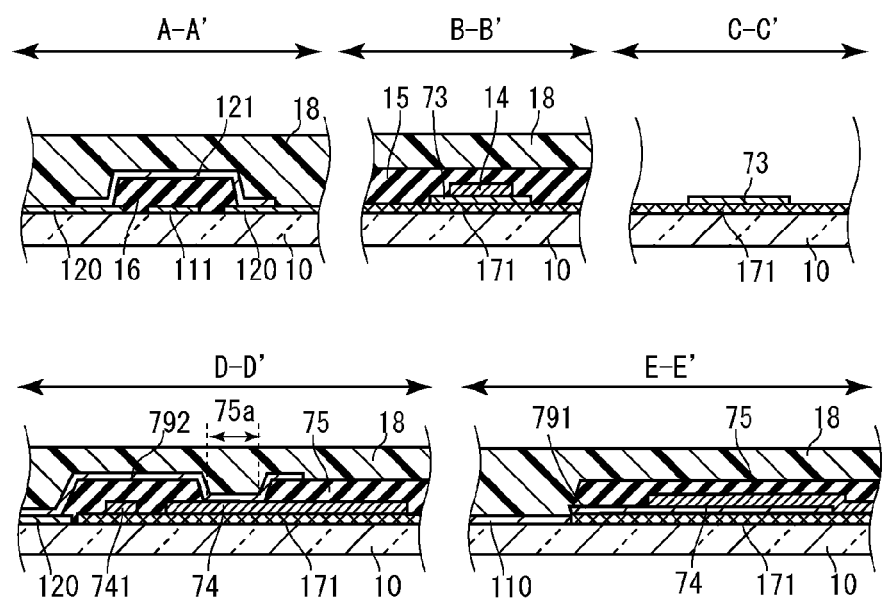
FIG. 8 shows cross-sectional views of FIG. 7 along the lines A-A', B-B', C-C', D-D', and E-E', respectively.

Here, in order to explain the effect of the touch panel 1 of the present embodiment, a hypothetical comparison example will be described. FIG. 7 is a plan view that shows a schematic configuration of a touch panel 7 according to Comparison Example 1. FIG. 8 shows cross-sectional views of FIG. 7 along the lines A-A', B-B', C-C', D-D', and E-E', respectively. The touch panel 7 includes a substrate 10, X electrodes 11, Y electrodes 12, terminals 73, wiring lines 74, ground wiring lines 741, insulating films 16 and 75, a light-shielding layer 171, a protective film 18, and lead-out electrodes 791 and 792.

The terminals 73 of the touch panel 7 differ from the terminals 13 of the touch panel 1 in having a single layer structure.

The touch panel 7 does not include the planarizing film 172 included in the touch panel 1. Compared to the touch panel 1, the touch panel 7 has a different configuration in the connecting portion between the wiring lines and the sensor electrodes (X electrodes and Y electrodes).

In the touch panel 7, the Y electrodes 12 and the wiring lines 74 are connected through the lead-out electrodes 792. As shown in FIGS. 7 and 8, the lead-out electrodes 792 are formed over the insulating film 75. The lead-out electrodes 792 are in contact with the wiring lines 74 through the contact holes 75a formed in the insulating film 75.

Figure 9:
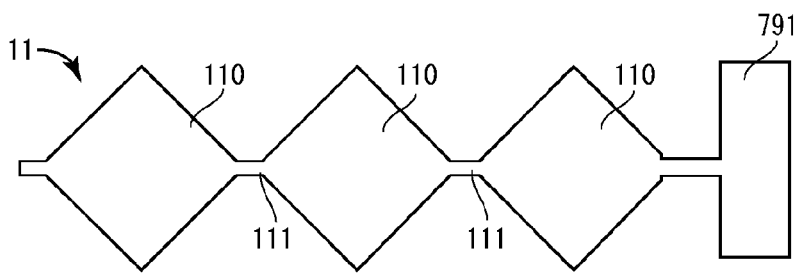
FIG. 9 is a drawing that shows a view of only an X electrode of a touch panel according to Comparison Example 1.

On the other hand, the X electrodes 11 and the wiring lines 74 are connected through the lead-out electrodes 791. FIG. 9 shows only the X electrode 11 and the lead-out electrode 791 of the touch panel 7. The X electrodes 11 and the lead-out electrodes 791 are integrally connected to each other.

Figure 10:
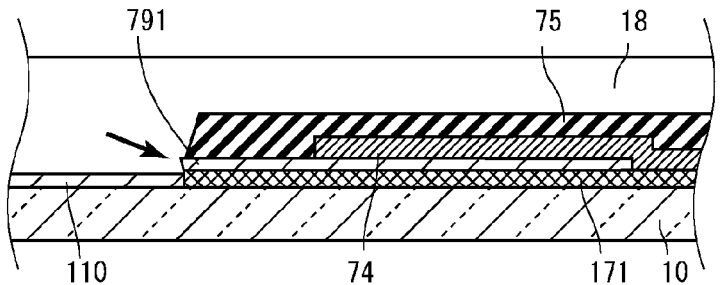
FIG. 10 is a cross-sectional view of FIG. 7 along the line E-E' for describing Comparison Example 1.

FIG. 10 is a cross-sectional view of FIG. 7 along the line E-E', and is a drawing for describing the touch panel 7. In FIG. 10, the protective film 18 is not shown with a hatching pattern for ease of viewing. As shown in FIG. 10, the wiring line 74 partially overlaps the lead-out electrode 791. According to this configuration, the wiring lines 74, the lead-out electrodes 791, and the X electrodes 11 are normally electrically connected to each other.

However, due to the height differential caused by the light-shielding layer 171 at the portion indicated with the arrow in FIG. 10, there are cases in which the X electrode 11 and the lead-out electrode 791 are not formed integrally. As already mentioned, the light-shielding layer 171 is formed relatively thick, and thus, it is difficult to form a forward taper therein. This is also due to the fact that the X electrodes 11 are formed thin so as to be difficult to see by a user. Also, if the surface roughness of the light-shielding layer 171 is great, there is a problem that it is not possible to form the lead-out electrode 791 as an even film.

In the touch panel 1 of the present embodiment, the planarizing film 172 is formed covering the light-shielding layer 171. Also, the X electrodes 11 and the Y electrodes 12 are connected to the wiring lines 14 that can be made relatively thick. According to this configuration, it is possible to increase the reliability of the connection between the wiring lines 14 and the sensor electrodes (X electrodes 11 and Y electrodes 12).

Comparison Example 2

Figure 11:
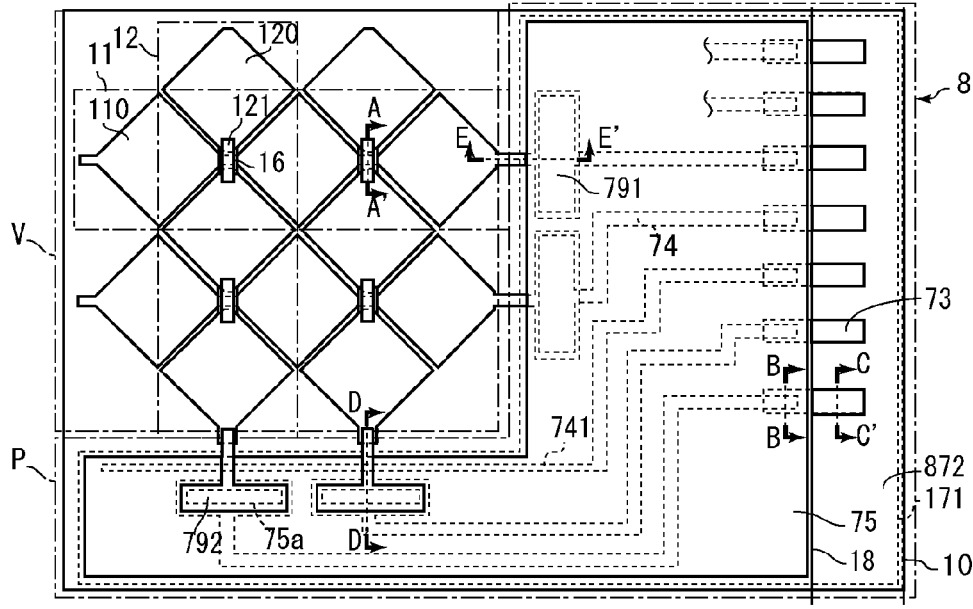
FIG. 11 is a plan view that shows a schematic configuration of a touch panel according to Comparison Example 2.
Figure 12:
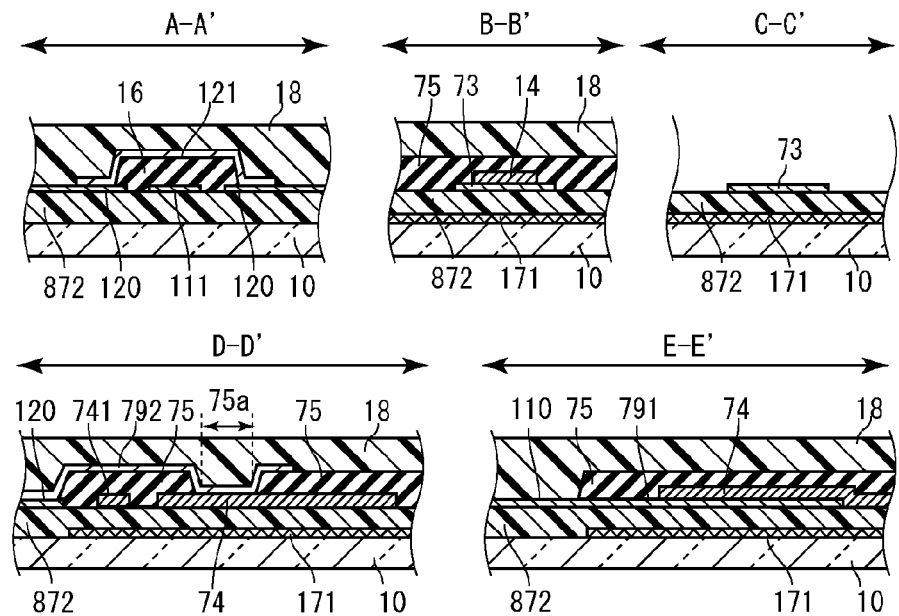
FIG. 12 shows cross-sectional views of FIG. 11 along the lines A-A', B-B', C-C', D-D', and E-E', respectively.

FIG. 11 is a plan view that shows a schematic configuration of a touch panel 8 according to Comparison Example 2. FIG. 12 shows cross-sectional views of FIG. 11 along the lines A-A', B-B', C-C', D-D', and E-E', respectively. The touch panel 8 includes a substrate 10, X electrodes 11, Y electrodes 12, terminals 73, wiring lines 74, a ground wiring line 741, insulating films 16 and 75, a light-shielding layer 171, a planarizing film 872, a protective film 18, and lead-out electrodes 791 and 792.

The touch panel 8, in addition to the configuration of the touch panel 7, further includes the planarizing film 872. The planarizing film 872 is formed on the entire surface of the substrate 10, covering the light-shielding layer 171.

In the touch panel 8, as shown in FIG. 12, the island-shaped electrodes 110 and the connecting portions 111 of the X electrodes 11, the island-shaped electrodes 120 of the Y electrodes 12, the terminals 73, and the lead-out electrodes 791 are formed on the planarizing film 872.

The planarizing film 872 sometimes absorbs water used during the washing step and moisture from the air. Also, solvents sometimes remain in the planarizing film 872. Furthermore, this moisture sometimes bubbles to the surface of the planarizing film 872. If the transparent electrode films (island-shaped electrodes 110 and 120, connecting portions 111, terminals 73, and lead-out electrodes 791) are formed on the planarizing film 872, then the moisture sometimes increases the resistance of the transparent electrode films.

Comparison Example 3

Figure 13:
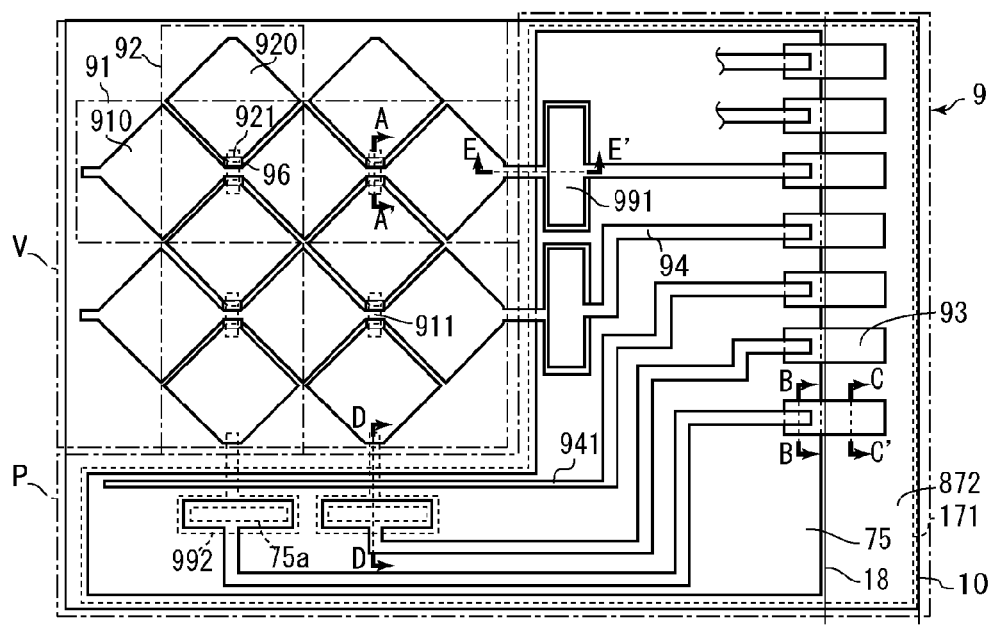
FIG. 13 is a plan view that shows a schematic configuration of a touch panel according to Comparison Example 3.
Figure 14:
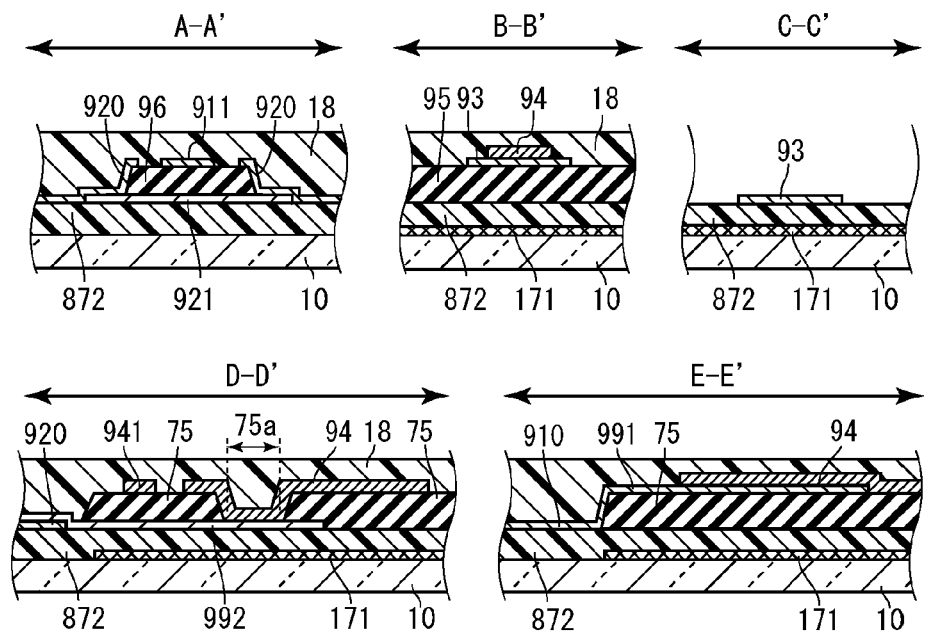
FIG. 14 shows cross-sectional views of FIG. 13 along the lines A-A', B-B', C-C', D-D', and E-E', respectively.

FIG. 13 is a plan view that shows a schematic configuration of a touch panel 9 according to Comparison Example 3. FIG. 14 shows cross-sectional views of FIG. 13 along the lines A-A', B-B', C-C', D-D', and E-E', respectively. The touch panel 9 includes a substrate 10, X electrodes 91, Y electrodes 92, terminals 93, wiring lines 94, a ground wiring line 941, insulating films 75 and 96, a light-shielding layer 171, a planarizing film 872, a protective film 18, and lead-out electrodes 991 and 992.

The X electrode 91 includes a plurality of island-shaped electrodes 910 disposed along one direction, and connecting portions 911 that connect adjacent island-shaped electrodes 910. The island-shaped electrodes 910 and the connecting portions 911 are integrally connected to each other.

The Y electrodes 92 include a plurality of island-shaped electrodes 920 disposed along a direction intersecting the X electrodes 91, and connecting portions 921 that connect adjacent island-shaped electrodes 920. As shown in FIG. 14, the island-shaped electrodes 920 are formed so as to partially overlap the connecting portions 921.

Insulating films 96 are formed in portions where the X electrodes 91 and the Y electrodes 92 intersect. The X electrodes 91 and the Y electrodes 92 are insulated from each other by this configuration.

The wiring lines 94 and the ground wiring line 941 formed on the insulating film 75. The terminals 93 straddle the insulating film 75 and the planarizing film 872. The wiring lines 94 and the ground wiring line 941 partially overlap the terminals 93, and are electrically connected thereto. The terminals 93 have a similar single layer structure to the terminals 73.

The X electrodes 91 and the wiring lines 94 are connected through the lead-out electrodes 991. The X electrodes 91 and the lead-out electrodes 991 are integrally connected to each other. The wiring lines 94 are formed so as to partially overlap the lead-out electrodes 991.

The Y electrodes 92 and the wiring lines 94 are connected through the lead-out electrodes 992. The lead-out electrodes 992 are formed below the insulating film 75. The wiring lines 94 and the lead-out electrodes 992 are in contact through contact holes 75a formed in the insulating film 75.

In the touch panel 9, the island-shaped electrodes 910 of the X electrodes 91, the island-shaped electrodes 920 of the Y electrodes 92, the connecting portions 921, the lead-out electrodes 922, and a portion of the terminals 93 are formed on the planarizing film 872. As in the touch panel 8, the planarizing film 872 sometimes contains moisture or the like, and thus, the X electrodes 91, the Y electrodes 92, and the like sometimes become high resistance.

Unlike the touch panels 8 and 9, according to the configuration of the touch panel 1 of the present embodiment, the planarizing film 172 is not formed in the sensing area V. As a result, it is possible to prevent the X electrodes 11, the Y electrodes 12, and the like from becoming high resistance.

According to the configuration of the touch panel 1, the terminals 13 have a two layer structure including the lower terminal layer 131 and the upper terminal layer 132. As a result, it is possible to increase the cross-sectional area of the terminals 13, which makes it possible to lower the resistance of the terminals 13.

Embodiment 2

The display device 100 equipped with a touch panel may include any of touch panels 2 to 5 to be described below instead of the touch panel 1.

Figure 15:
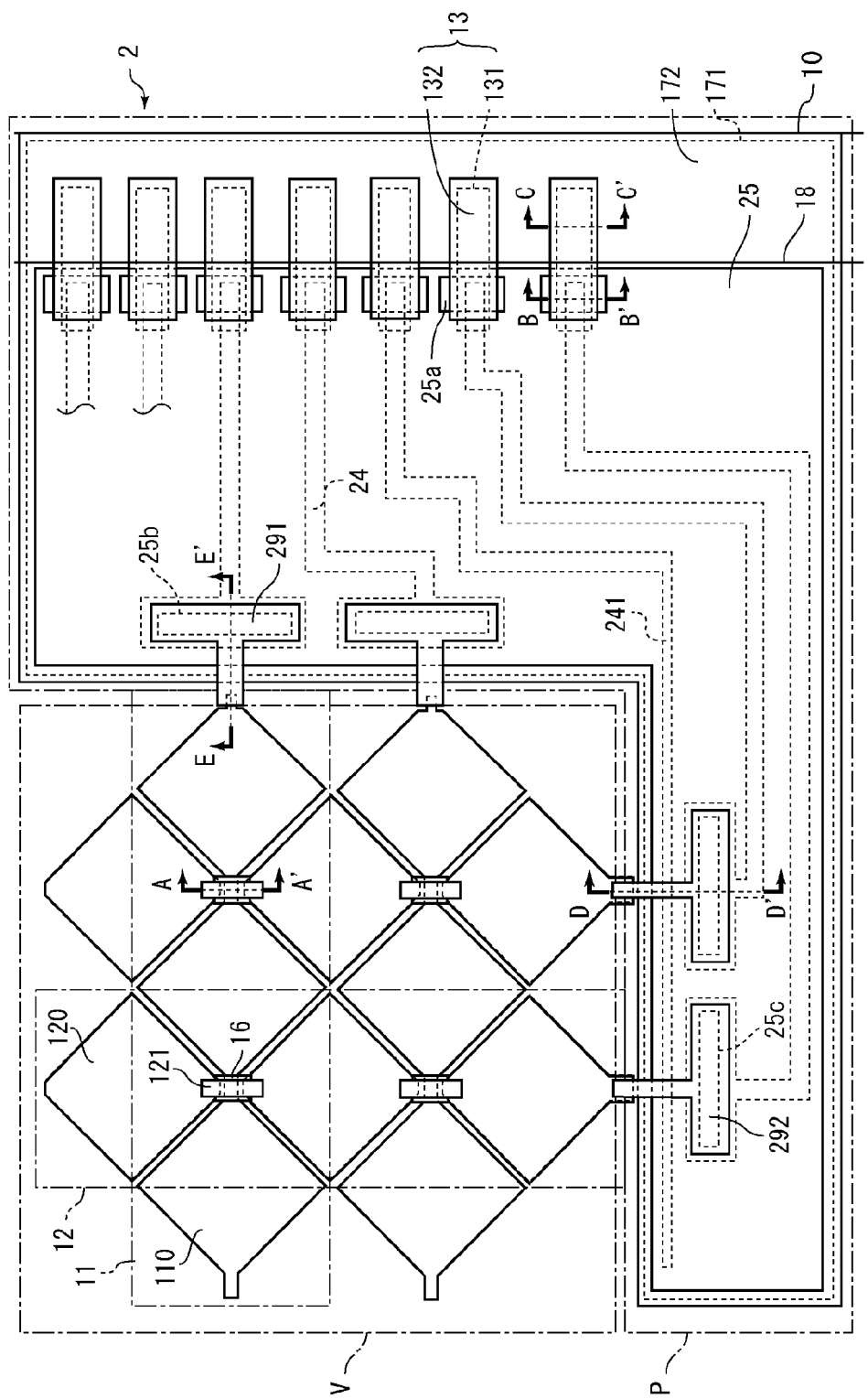
FIG. 15 is a plan view that shows a schematic configuration of a touch panel according to Embodiment 2 of the present invention.
Figure 16:
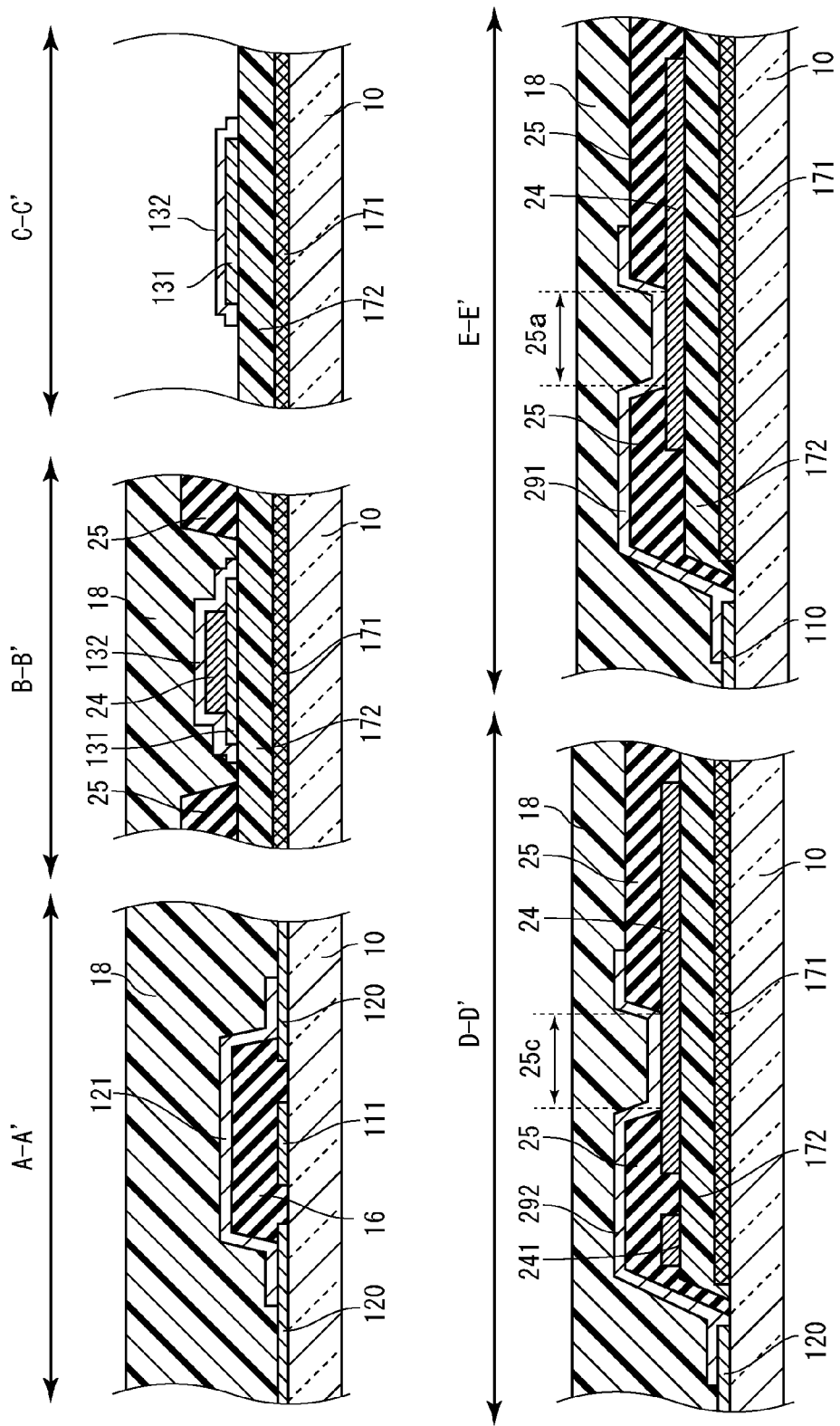
FIG. 16 shows cross-sectional views of FIG. 15 along the lines A-A', B-B', C-C', D-D', and E-E', respectively.

FIG. 15 is a plan view that schematically shows a configuration of a touch panel 2 according to Embodiment 2 of the present invention. FIG. 16 shows cross-sectional views of FIG. 15 along the lines A-A', B-B', C-C', D-D', and E-E', respectively. The touch panel 2 includes a substrate 10, X electrodes 11, Y electrodes 12, terminals 13, wiring lines 24, a ground wiring line 241, insulating films 16 and 25, a light-shielding layer 171, a planarizing film 172, a protective film 18, and lead-out electrodes 291 and 292.

The touch panel 2 differs from the touch panel 1 in terms of the method by which the sensor electrodes and the wiring lines are connected.

The X electrodes 11 and the wiring lines 24 are connected through the lead-out electrodes 291. The lead-out electrodes 291 are formed over the insulating film 25 and the island-shaped electrodes 110 of the X electrodes 11. The lead-out electrodes 291 and the wiring lines 24 are in contact through contact holes 25a formed in the insulating film 25.

Similarly, the Y electrodes 12 and the wiring lines 24 are connected through the lead-out electrodes 292. The lead-out electrodes 292 are formed over the insulating film 25 and over the island-shaped electrodes 120 of the Y electrodes 12. The lead-out electrodes 292 and the wiring lines 24 are in contact through contact holes 25c formed in the insulating film 25.

The connecting portions 121 of the Y electrodes 12, the upper terminal layer 132 of the terminals 13, and the lead-out electrodes 291 and 292 are formed so as to be thicker than the island-shaped electrodes 110 of the X electrodes 11, the connecting portions 111, the island-shaped electrodes 120 of the Y electrodes 12, and the lower terminal layer 131 of the terminals 13.

<Method of Manufacturing Touch Panel 2>

A manufacturing method for the touch panel 2 will be schematically described below with reference to FIGS. 17A to 17D. FIGS. 17A to 17D show cross-sectional views of FIG. 15 along the lines A-A', B-B', C-C', D-D', and E-E', respectively.

First, the light-shielding layer 171 is formed on the substrate 10. Then, the planarizing film 172 is formed so as to cover the light-shielding layer 171. Also, the island-shaped electrodes 110 of the X electrodes 11, the connecting portions 111, the island-shaped electrodes 120 of the Y electrodes 12, and the lower terminal layer 131 of the terminals 13 are formed. These steps are the same as those of the touch panel 1 and will therefore not be shown in the drawings.

Figure 17A:
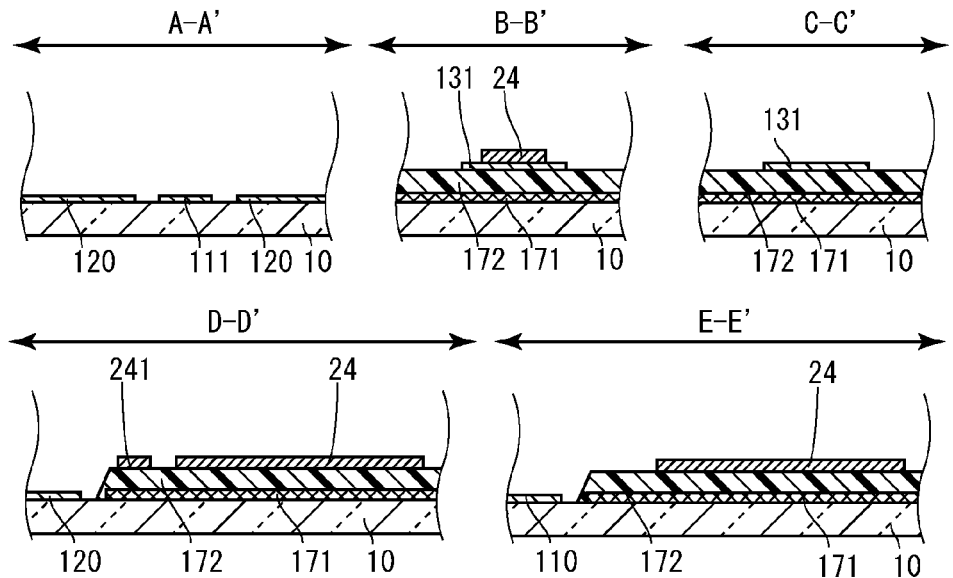
FIG. 17A shows cross-sectional views for describing a method of manufacturing the touch panel according to Embodiment 2 of the present invention.

Next, as shown in FIG. 17a, the wiring lines 24 and the ground wiring line 241 are formed. These are made of a metal or a multilayer metal as in the wiring lines 14 and the ground wiring line 141 of the touch panel 1, for example. These are formed by sputtering or vapor deposition, for example, and are patterned by photolithography.

Figure 17B:
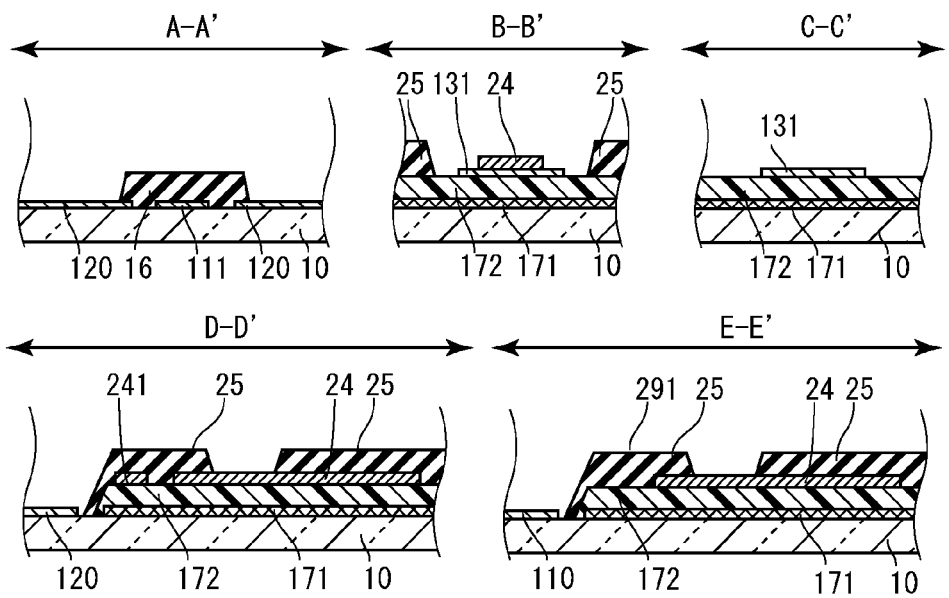
FIG. 17B shows cross-sectional views for describing the method of manufacturing the touch panel according to Embodiment 2 of the present invention.

Next, as shown in FIG. 17B, the insulating films 16 and 25 are formed. These are similar to the insulating films 15 and 16 of the touch panel 1 in that they are an organic or inorganic insulator, and are patterned by photolithography.

In the present embodiment, it is preferable that the insulating film 25, in addition to the insulating films 16, be formed with a front-tapered edge. This is because, in the present embodiment, the lead-out electrodes 291 are formed over the electrode insulating film 25 and over the X electrodes 11. Similarly, the lead-out electrodes 292 are formed over the electrode insulating film 25 and over the Y electrodes 12.

Figure 17C:
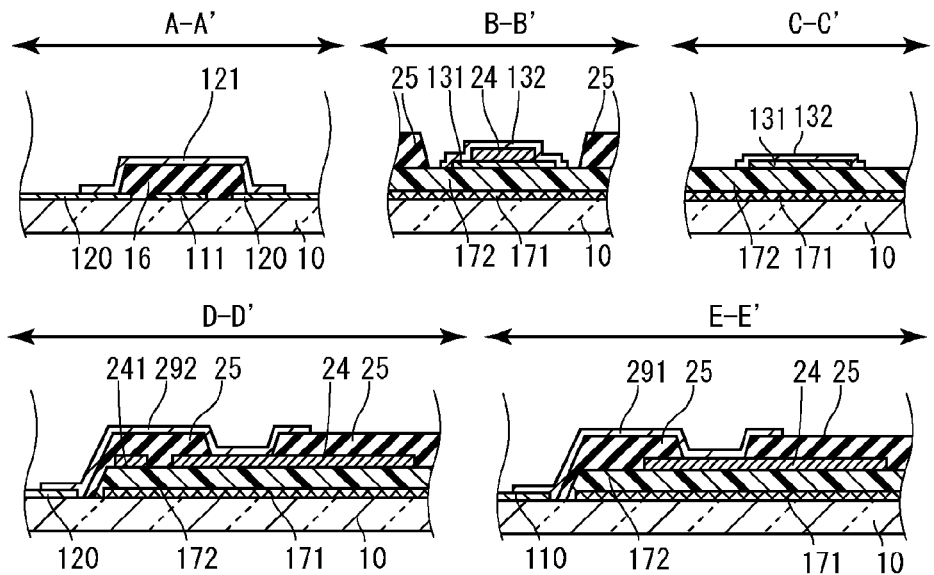
FIG. 17C shows cross-sectional views for describing the method of manufacturing the touch panel according to Embodiment 2 of the present invention.

Next, as shown in FIG. 17C, the connecting portions 121 of the Y electrodes 12, the upper terminal layer 132 of the terminals 13, and the lead-out electrodes 291 and 292 are formed.

These are made of ITO or IZO, for example. These are formed by CVD or sputtering, for example, and are patterned by photolithography. At this time, the connecting portions 121 of the Y electrodes 12, the upper terminal layer 132 of the terminals 13, and the lead-out electrodes 291 and 292 are formed so as to be thicker than the island-shaped electrodes 110 of the X electrodes 11, the connecting portions 111, the island-shaped electrodes 120 of the Y electrodes 12, and the lower terminal layer 131 of the terminals 13.

Figure 17D:
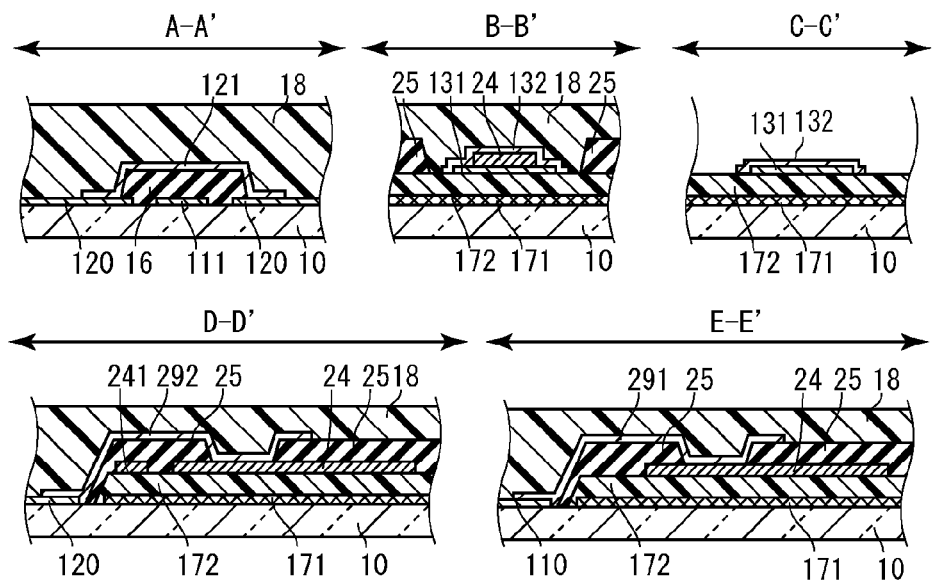
FIG. 17D shows cross-sectional views for describing the method of manufacturing the touch panel according to Embodiment 2 of the present invention.

Lastly, as shown in FIG. 17D, the protective film 18 is formed so as to cover almost the entire surface of the substrate 10.

The configuration of the touch panel 2 and the manufacturing method according to Embodiment 2 of the present invention have been described above.

In the present embodiment also, similar to the touch panel 1, the planarizing film 172 is formed so as to cover the light-shielding layer 171. The planarizing film 172 is formed only in the non-sensing area P and not in the sensing area V. The terminals 13 have a two layer structure.

In the present embodiment, the X electrodes 11 and the wiring lines 24 are connected through the lead-out electrodes 291. Similarly, the Y electrodes 12 and the wiring lines 24 are connected through the lead-out electrodes 292. The lead-out electrodes 291 and 292 are formed of the same material and in the same step as the connecting portions 121 of the Y electrodes 12, and the upper terminal layer 132 of the terminals 13.

It is preferable that the island-shaped electrodes 110 of the X electrodes 11 and the island-shaped electrodes 120 of the Y electrodes 12 be formed thin so as to be difficult to see by a user. Compared to these, the connecting portions 121 of the Y electrodes 12 have a small area, and thus, can be formed relatively thick. Thus, it is possible to also form the lead-out electrodes 291 and 292 thick, in the same step as the connecting portions 121 of the Y electrodes 12. By forming the lead-out electrodes 291 and 292 thick, it is possible to make the lead-out electrodes 291 and 292 less susceptible to disconnection at the boundary between the sensing area V and the non-sensing area P.

According to the present embodiment, it is possible to form the lead-out electrodes 291 and 292 thick and increase reliability without increasing the thickness of the island-shaped electrodes 110 and 120 or increasing the number of patterning steps.

Embodiment 3

Figure 18:
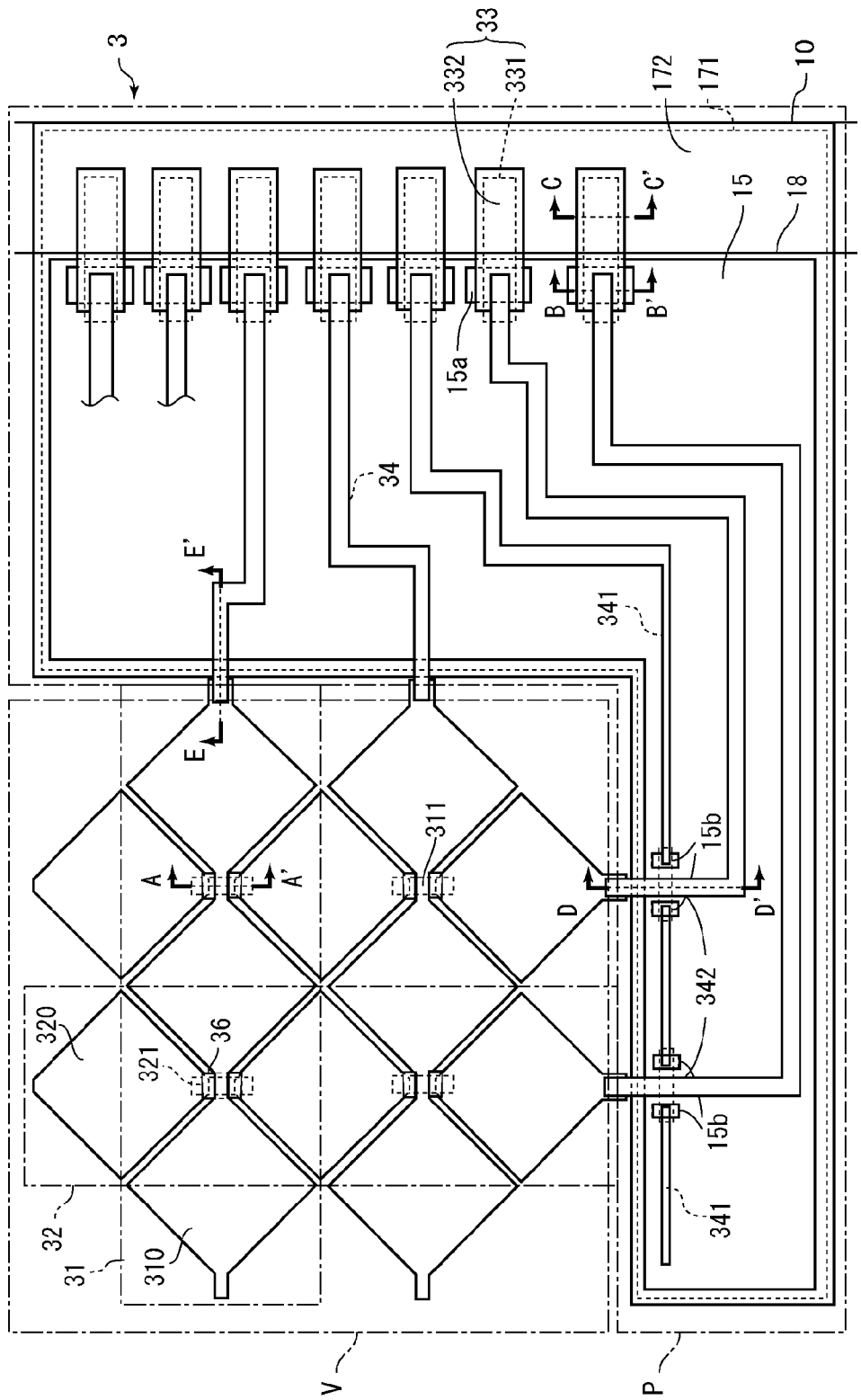
FIG. 18 is a plan view that shows a schematic configuration of a touch panel according to Embodiment 3 of the present invention.
Figure 19:
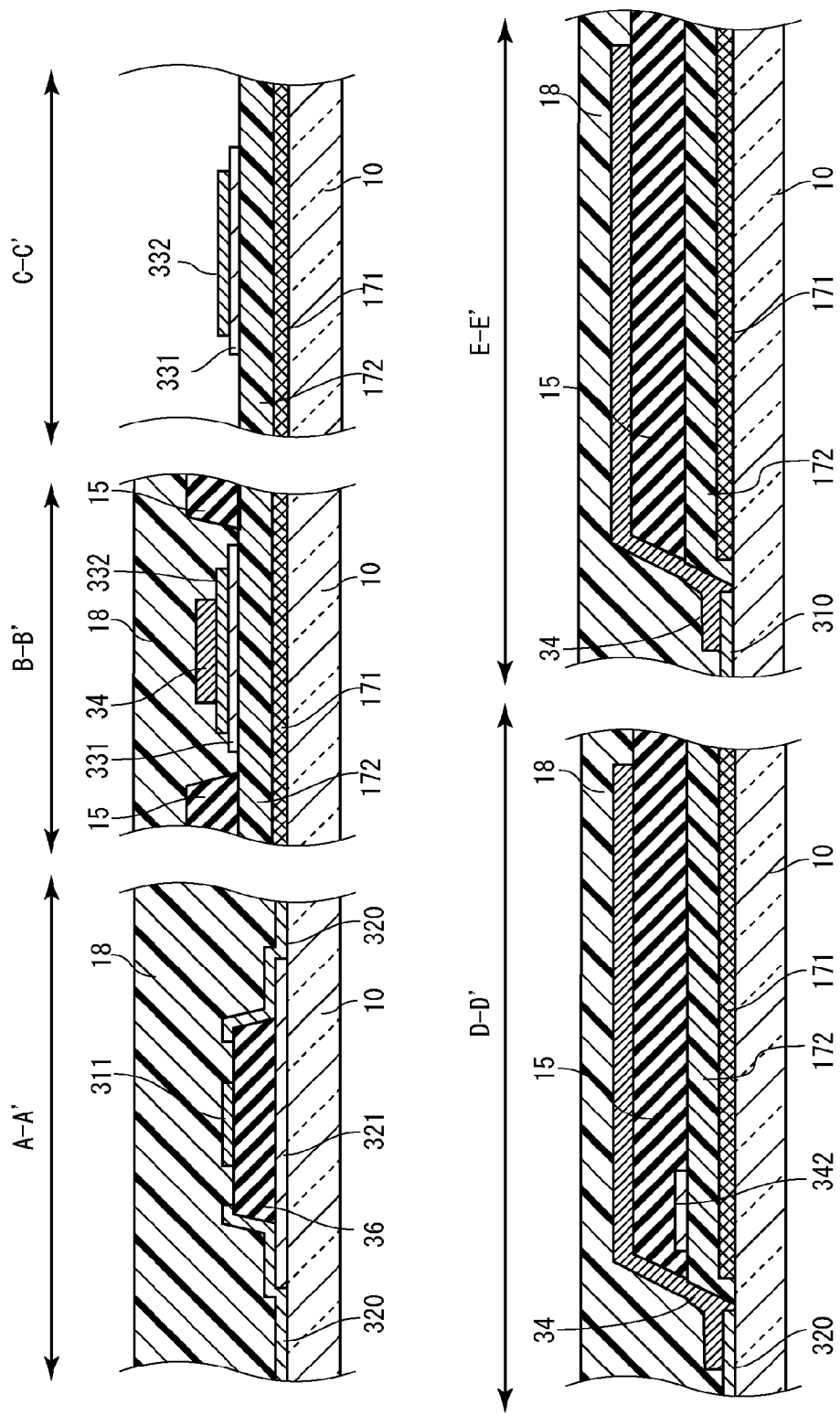
FIG. 19 shows cross-sectional views of FIG. 18 along the lines A-A', B-B', C-C', D-D', and E-E', respectively.

FIG. 18 is a plan view that schematically shows a configuration of a touch panel 3 according to Embodiment 3 of the present invention. FIG. 19 shows cross-sectional views of FIG. 18 along the lines A-A', B-B', C-C', D-D', and E-E', respectively. The touch panel 3 includes a substrate 10, X electrodes 31, Y electrodes 32, terminals 33, wiring lines 34, a ground wiring line 341, bridge wiring lines 342, insulating films 15 and 36, a light-shielding layer 171, a planarizing film 172, and a protective film 18.

That is, the touch panel 3 has a different configuration for mainly the X electrodes, the Y electrodes, and the wiring lines compared to the touch panel 1.

The X electrode 31 includes a plurality of island-shaped electrodes 310 disposed along one direction, and connecting portions 311 that connect adjacent island-shaped electrodes 310. The island-shaped electrodes 310 and the connecting portions 311 are integrally connected to each other.

The Y electrodes 32 include a plurality of island-shaped electrodes 320 disposed along a direction intersecting with the X electrodes 31, and connecting portions 321 that connect adjacent island-shaped electrodes 320. As shown in FIG. 19, the island-shaped electrodes 320 are formed so as to partially overlap the connecting portions 321.

Insulating films 36 are formed in portions where the X electrodes 31 and the Y electrodes 32 intersect. The X electrodes 31 and the Y electrodes 32 are insulated from each other by this configuration.

The wiring lines 34 and the ground wiring line 341 are covered by the insulating film 15.

The terminal 33 has a two layer structure including a lower terminal layer 331 and an upper terminal layer 332. The lower terminal layer 331 is formed below the insulating film 15 and the upper terminal layer 332 is formed above the insulating film 15. The lower terminal layer 331 and the upper terminal layer 332 are in contact with each other through the contact hole 15a. The wiring lines 34 are formed so as to partially overlap the upper terminal layer 332.

The wiring lines 34 straddle the sensing area V and the non-sensing area P, and are in contact with the X electrodes 31 or the Y electrodes 32.

The ground wiring line 341 is connected to neither the X electrodes 31 nor the Y electrodes 32. The ground wiring line 341 functions as a shielding line that blocks electromagnetic noise.

The bridge wiring lines 342 are formed where the wiring lines 34 intersect with the ground wiring line 341. The bridge wiring lines 342 are formed below the insulating film 15. The ground wiring line 341 and the bridge wiring lines 342 are in contact with each other through the contact holes 15b. As a result, the wiring lines 34 and the ground wiring line 341 are not in contact with each other.

<Method of Manufacturing Touch Panel 3>

A manufacturing method for the touch panel 3 will be schematically described below with reference to FIGS. 20A to 20E. FIGS. 20A to 20D show cross-sectional views of FIG. 18 along the lines A-A', B-B', C-C', D-D', and E-E', respectively.

First, the light-shielding layer 171 is formed on the substrate 10. Then, the planarizing film 172 is formed so as to cover the light-shielding film 171. These steps are the same as those of the touch panel 1 and will therefore not be shown in the drawings.

Figure 20A:
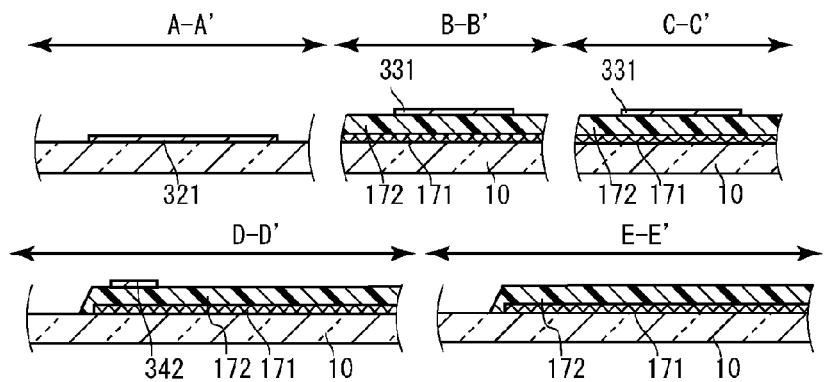
FIG. 20A shows cross-sectional views for describing a method of manufacturing the touch panel according to Embodiment 3 of the present invention.

Next, as shown in FIG. 20A, the connecting portions 321 of the Y electrodes 32, the lower terminal layer 331 of the terminals 33, and the bridge wiring lines 342 are formed. These are made of ITO or IZO, for example. These are formed by CVD or sputtering, for example, and are patterned by photolithography.

Figure 20B:
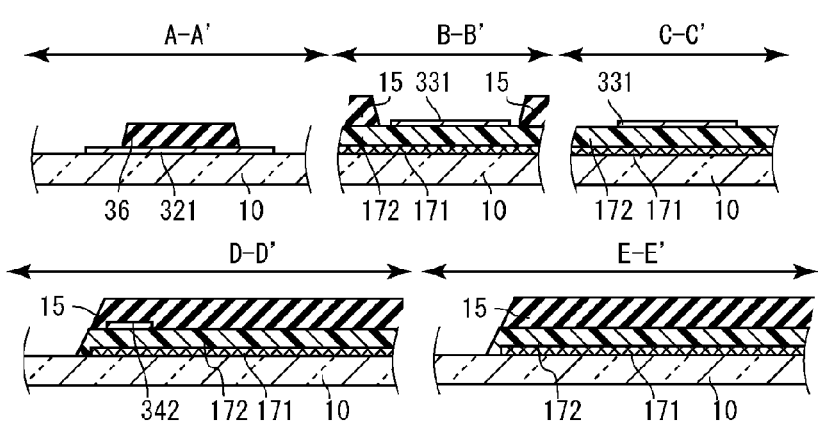
FIG. 20B shows cross-sectional views for describing the method of manufacturing the touch panel according to Embodiment 3 of the present invention.

Next, as shown in FIG. 20B, the insulating films 15 and 36 are formed. These are similar to the insulating films 15 and 16 of the touch panel 1 in that they are an organic or inorganic insulator, and are patterned by photolithography.

It is preferable that the insulating films 15 and 36 be formed with forward-tapered edges.

Figure 20C:
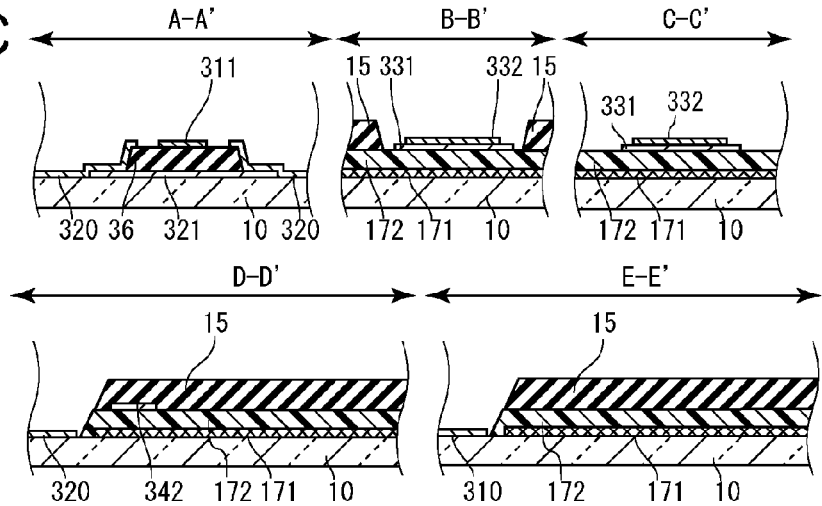
FIG. 20C shows cross-sectional views for describing the method of manufacturing the touch panel according to Embodiment 3 of the present invention.

Next, as shown in FIG. 20C, the island-shaped electrodes 310 of the X electrodes 31, the connecting portions 311, the island-shaped electrodes 320 of the Y electrodes 32, and the upper terminal layer 132 of the terminals 13 are formed. These are made of ITO or IZO, for example. These are formed by CVD or sputtering, for example, and are patterned by photolithography.

Figure 20D:
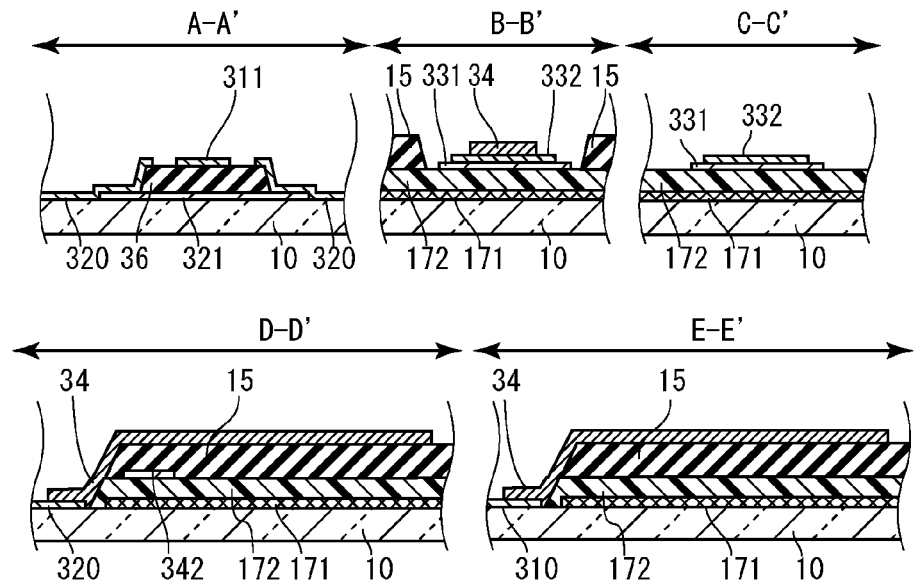
FIG. 20D shows cross-sectional views for describing the method of manufacturing the touch panel according to Embodiment 3 of the present invention.

As shown in FIG. 20D, wiring lines 34 are formed. A ground wiring line 341 (refer to FIG. 18) is also formed at the same time although it is not shown in FIG. 20D. These are made of a metal or a multilayer metal as in the wiring lines 14 and the ground wiring line 141 of the touch panel 1, for example. These are formed by sputtering or vapor deposition, for example, and are patterned by photolithography.

Figure 20E:
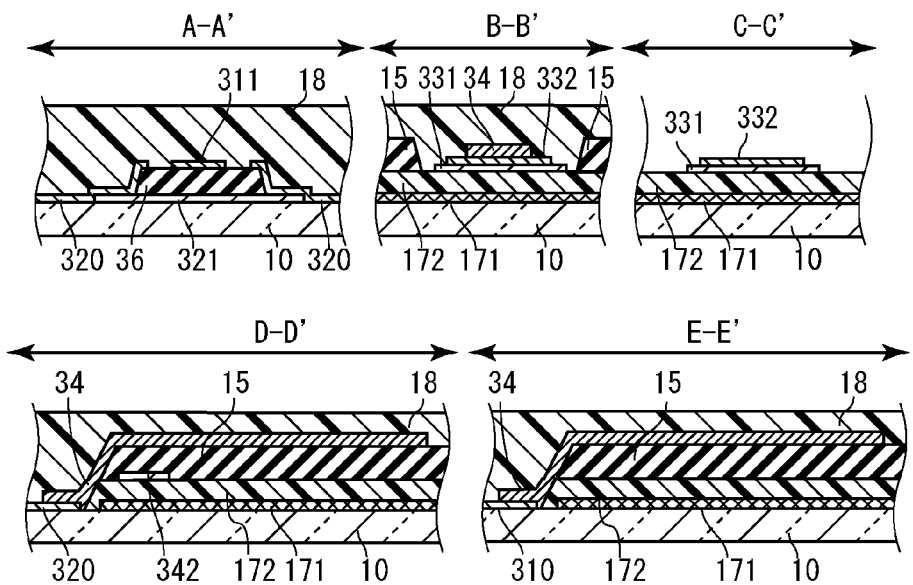
FIG. 20E shows cross-sectional views for describing the method of manufacturing the touch panel according to Embodiment 3 of the present invention.

Lastly, as shown in FIG. 20E, the protective film 18 is formed so as to cover almost the entire surface of the substrate 10.

The configuration of the touch panel 3 and the manufacturing method according to Embodiment 3 of the present invention have been described above.

In the present embodiment also, similar to the touch panel 1, the planarizing film 172 is formed so as to cover the light-shielding layer 171. The planarizing film 172 is formed only in the non-sensing area P and not in the sensing area V. The terminals 13 have a two layer structure.

In the present embodiment, the wiring lines 34 are formed so as to straddle the sensing area V and the non-sensing area P. As a result, the X electrodes 31 and Y electrodes 32 are connected to the wiring lines 34. It is preferable that the X electrodes 31 and the Y electrodes 32 be formed thin so as to be difficult to see by the user. On the other hand, the wiring lines 34 can be formed relatively thick. Thus, it is possible to have a configuration in which the wiring lines 14 are not susceptible to disconnection at the boundary between the sensing area V and the non-sensing area P.

Modification Example of Embodiment 3

Figure 21:
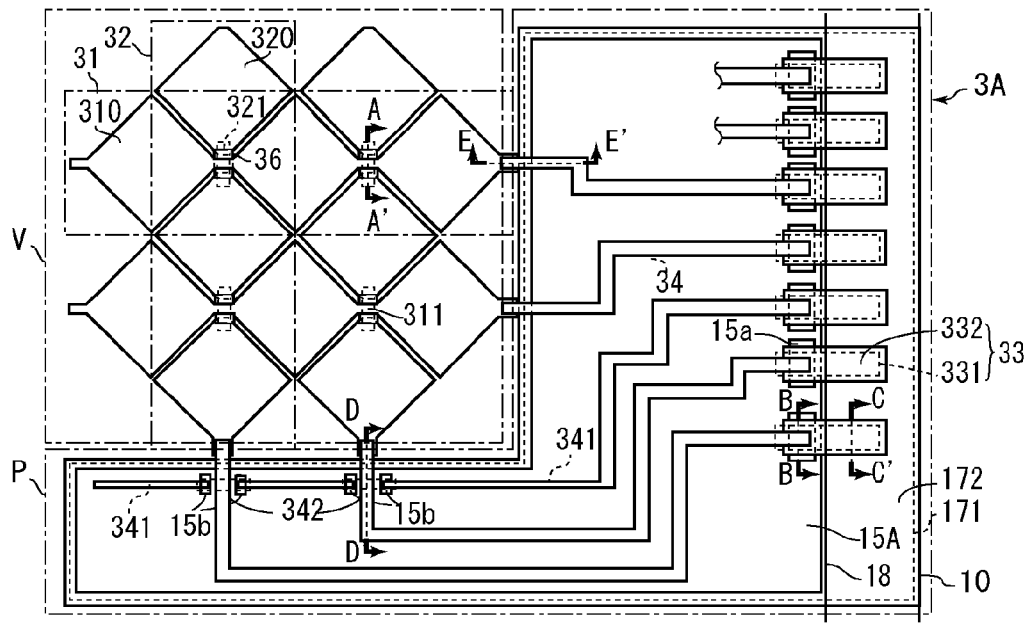
FIG. 21 is a plan view that shows a schematic configuration of a touch panel according to a modification example of Embodiment 3 of the present invention.
Figure 22:
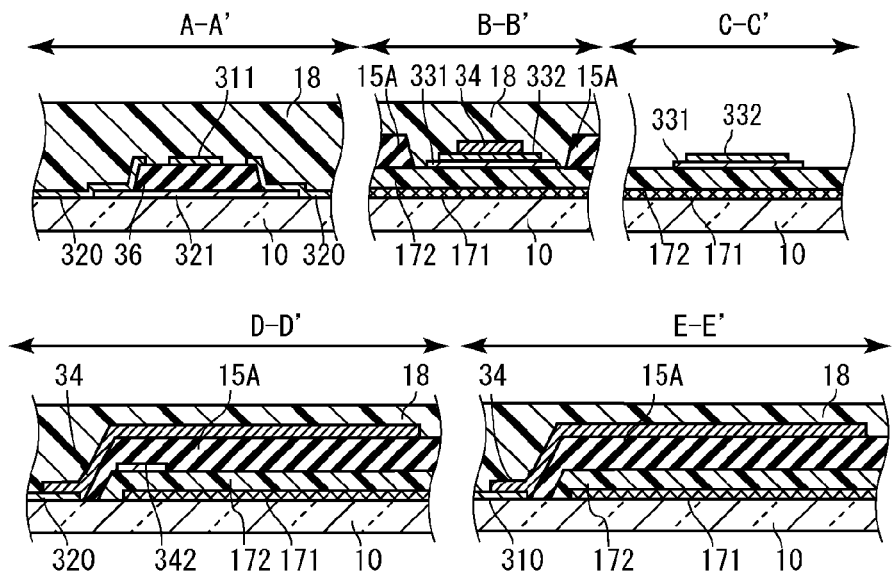
FIG. 22 shows cross-sectional views of FIG. 21 along the lines A-A', B-B', C-C', D-D', and E-E', respectively.

FIG. 21 is a plan view that shows a schematic configuration of a touch panel 3A of a modification example of Embodiment 3 of the present invention. FIG. 22 shows cross-sectional views of FIG. 21 along the lines A-A', B-B', C-C', D-D', and E-E', respectively. The touch panel 3 includes a substrate 10, X electrodes 31, Y electrodes 32, terminals 33, wiring lines 34, a ground wiring line 341, bridge wiring lines 342, insulating films 15A and 36, a light-shielding layer 171, a planarizing film 172, and a protective film 18.

The touch panel 3A has a different configuration for the insulating films compared to the touch panel 3. As shown in the cross-sectional views along the line D-D' and the line E-E', the insulating films 15A is formed so as to cover the edge of the planarizing film 172.

According to the configuration of the touch panel 3A, even if the tapering of the planarizing film 172 is not done well (if the angle is too sharp or if it is reverse-tapered), by having the insulating films 15A have a shallow angle front-tapered edge, it is possible to make the wiring lines 34 less susceptible to disconnection.

Embodiment 4

Figure 23:
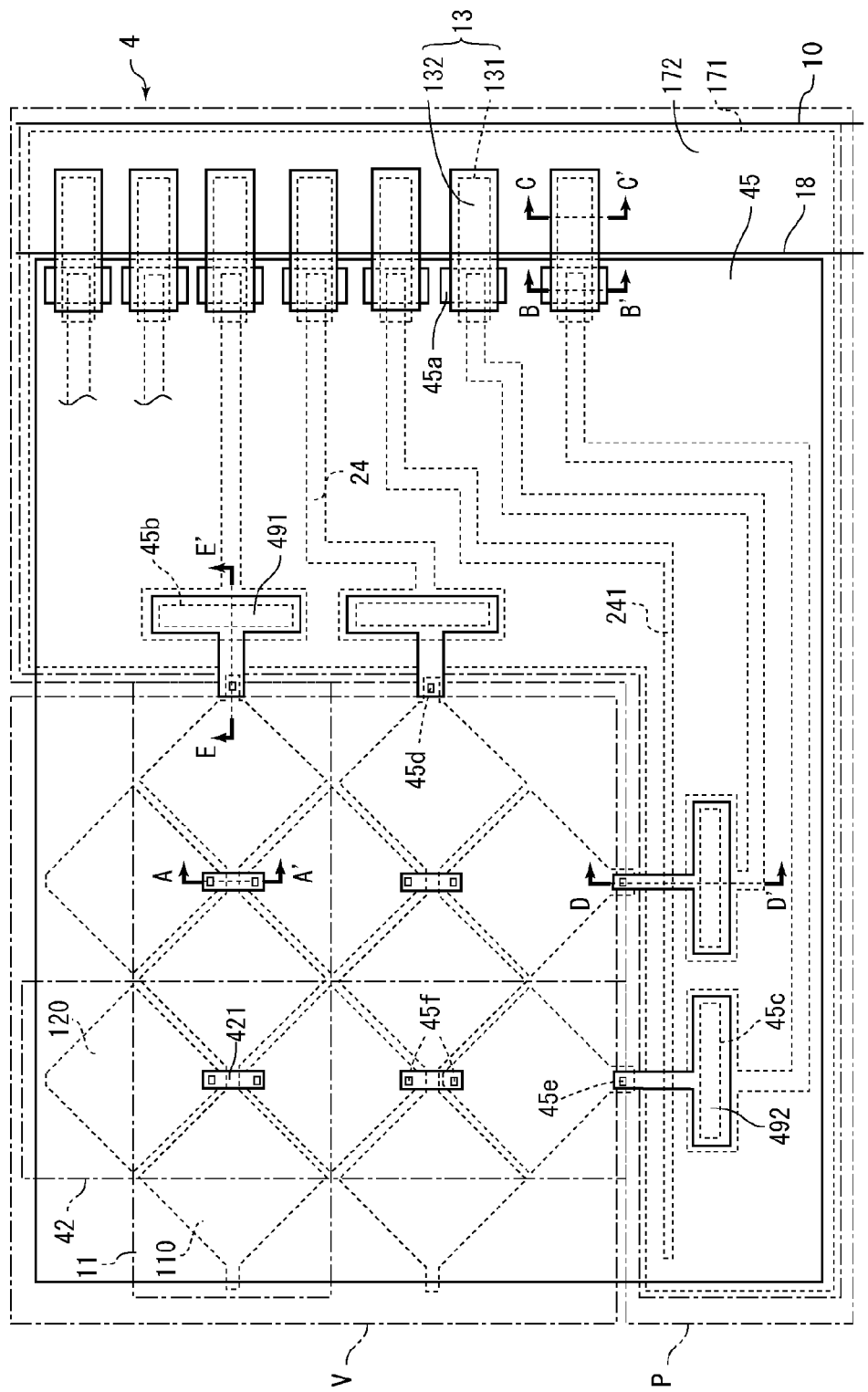
FIG. 23 is a plan view that shows a schematic configuration of a touch panel according to Embodiment 4 of the present invention.
Figure 24:
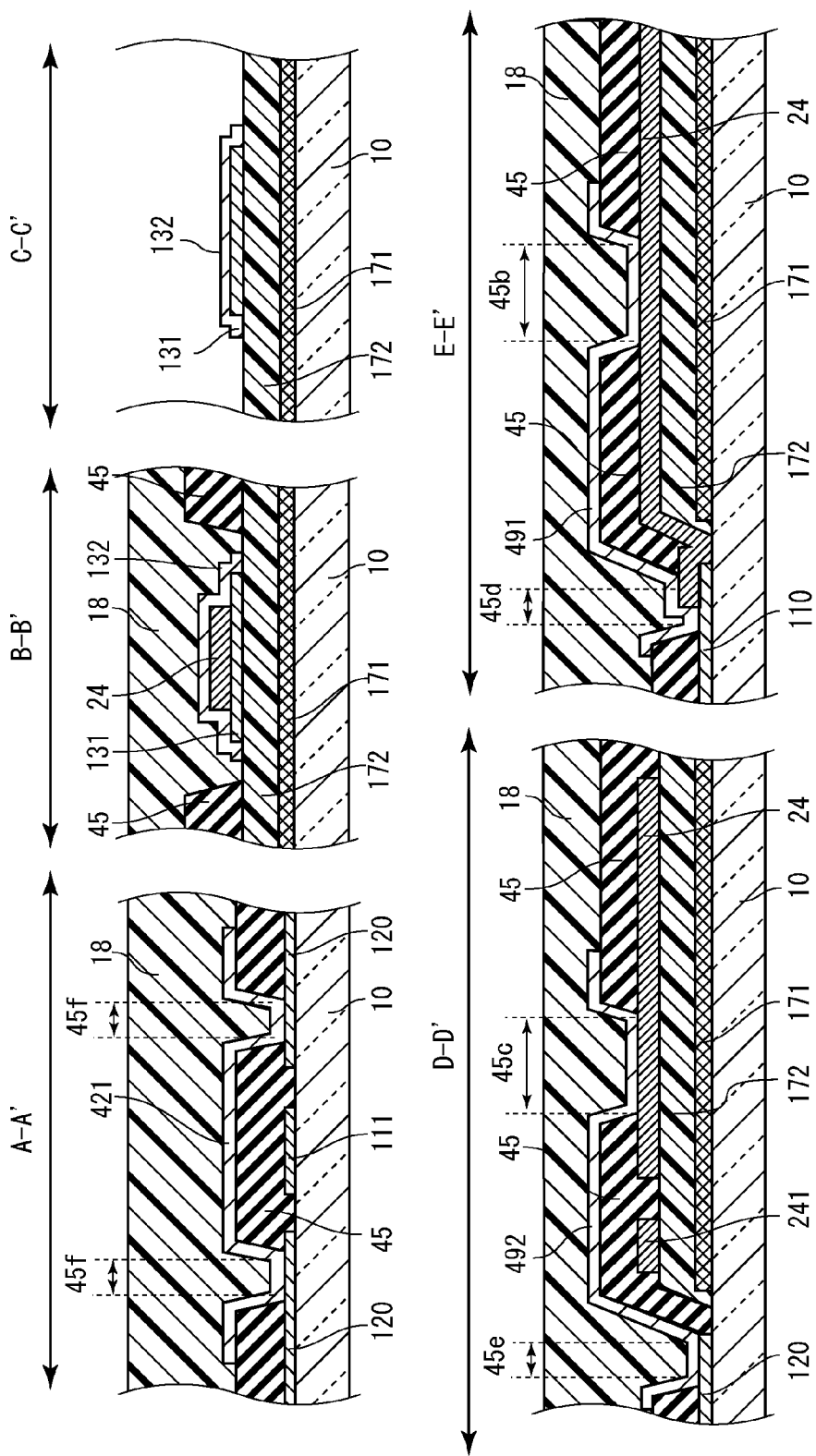
FIG. 24 shows cross-sectional views of FIG. 23 along the lines A-A', B-B', C-C', D-D', and E-E', respectively.

FIG. 23 is a plan view that schematically shows a configuration of a touch panel 4 according to Embodiment 4 of the present invention. FIG. 24 shows cross-sectional views of FIG. 23 along the lines A-A', B-B', C-C', D-D', and E-E', respectively. The touch panel 4 includes a substrate 10, X electrodes 11, Y electrodes 42, terminals 13, wiring lines 24, a ground wiring line 241, an insulating film 45, a light-shielding layer 171, a planarizing film 172, and a protective film 18.

The touch panel 4 has a different configuration mainly for the Y electrodes and the insulating film compared to the touch panel 2.

The insulating film 45 is formed over almost the entire surface of the substrate 10 over both the sensing area V and the non-sensing area P. The insulating film 45 also has contact holes 45a to 45f formed therein.

The island-shaped electrodes 110 and connecting portions 111 of the X electrodes 11 along with the island-shaped electrodes 120 of the Y electrodes 42 are formed below the insulating film 45.

The Y electrodes 42 include a plurality of island-shaped electrodes 120 disposed along a direction intersecting the X electrodes 11, and connecting portions 421 that connect adjacent island-shaped electrodes 120. The connecting portions 421 are formed on the insulating film 45. The island-shaped electrodes 120 and the connecting portions 421 are in contact with each other through the contact holes 45f formed in the insulating film 45. The X electrodes 11 and the Y electrodes 42 are insulated from each other by this configuration.

The wiring lines 24 and the ground wiring line 241 are formed below the insulating film 45.

The X electrodes 11 and the wiring lines 24 are connected through the lead-out electrodes 491. The lead-out electrodes 491 are formed on the insulating film 45. The wiring lines 24 and the lead-out electrodes 491 are in contact with each other through the contact holes 45b formed in the insulating film 45. The island-shaped electrodes 110 of the X electrodes 11 and the lead-out electrodes 491 are in contact with each other through the contact holes 45d formed in the insulating film 45.

The Y electrodes 42 and the wiring lines 24 are connected through the lead-out electrodes 492. The lead-out electrodes 492 are formed above the insulating film 45. The wiring lines 24 and the lead-out electrodes 492 are in contact with each other through the contact holes 45c formed in the insulating film 45. The island-shaped electrodes 420 of the Y electrodes 42 and the lead-out electrodes 492 are in contact with each other through the contact holes 45e formed in the insulating film 45.

The connecting portions 421 of the Y electrodes 42, the upper terminal layer 132 of the terminals 13, and the lead-out electrodes 491 and 492 are formed so as to be thicker than the island-shaped electrodes 110 of the X electrodes 11, the connecting portions 111, the island-shaped electrodes 120 of the Y electrodes 42, and the lower terminal layer 131 of the terminals 13.

The terminal 13 has a two layer structure including a lower terminal layer 131 and an upper terminal layer 132. The lower terminal layer 131 is formed below the insulating film 45 and the upper terminal layer 132 is formed above the insulating film 45. The lower terminal layer 131, the upper terminal layer 132, and the wiring lines 24 are in contact with each other through the contact holes 45a. As shown in the cross-sectional view along the line B-B' in FIG. 24, the lower terminal layer 131 and the upper terminal layer 132 sandwich the wiring line 24.

<Method of Manufacturing Touch Panel 4>

Figure 25A:
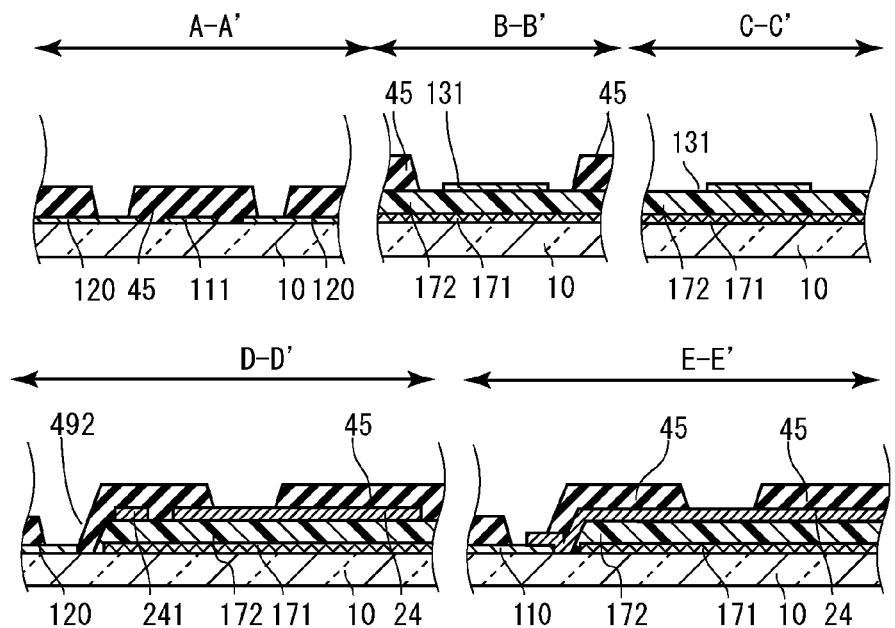
FIG. 25A shows cross-sectional views for describing a method of manufacturing the touch panel according to Embodiment 4 of the present invention.
Figure 25B:
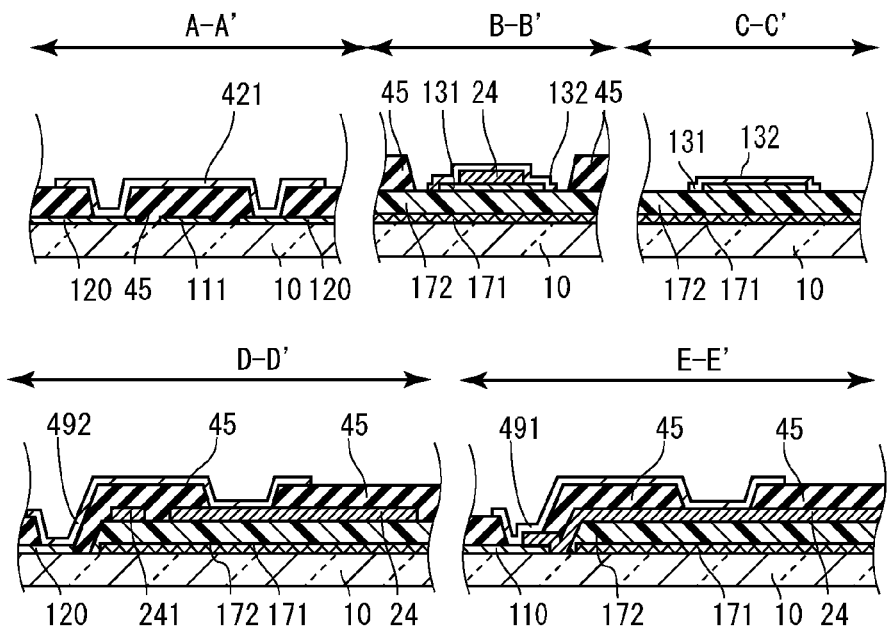
FIG. 25B shows cross-sectional views for describing the method of manufacturing the touch panel according to Embodiment 4 of the present invention.
Figure 25C:
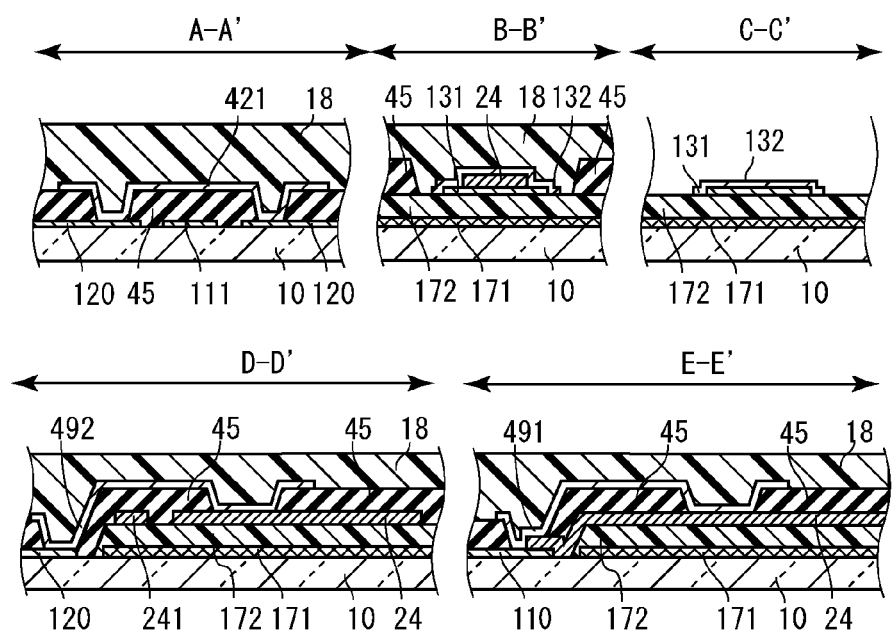
FIG. 25C shows cross-sectional views for describing the method of manufacturing the touch panel according to Embodiment 4 of the present invention.

A manufacturing method for the touch panel 4 will be schematically described below with reference to FIGS. 25A to 25C. FIGS. 25A to 25C show cross-sectional views of FIG. 23 along the lines A-A', B-B', C-C', D-D', and E-E', respectively.

First, the light-shielding layer 171 is formed on the substrate 10. Then, the planarizing film 172 is formed so as to cover the light-shielding layer 171. Also, the island-shaped electrodes 110 of the X electrodes 11, the connecting portions 111, the island-shaped electrodes 120 of the Y electrodes 42, and the lower terminal layer 131 of the terminals 13 are formed. Then, the wiring lines 24 and the ground wiring line 241 are formed. These steps are the same as those of the touch panel 2 and will therefore not be shown in the drawings.

Next, as shown in FIG. 25A, the insulating film 45 is formed over almost the entire surface of the substrate 10 over both the sensing area V and the non-sensing area P. The insulating film 45 is an organic or inorganic insulator like the insulating films 15 and 16 of the touch panel 1, and is patterned by photolithography. At this time, the contact holes 45a to 45b are also formed simultaneously.

Next, as shown in FIG. 25B, the connecting portions 421 of the Y electrodes 42, the upper terminal layer 132 of the terminals 13, and the lead-out electrodes 491 and 492 are formed.

These are made of ITO or IZO, for example. These are formed by CVD or sputtering, for example, and are patterned by photolithography. At this time, the connecting portions 421 of the Y electrodes 42, the upper terminal layer 132 of the terminals 13, and the lead-out electrodes 491 and 492 are formed so as to be thicker than the island-shaped electrodes 110 of the X electrodes 11, the connecting portions 111, the island-shaped electrodes 120 of the Y electrodes 12, and the lower terminal layer 131 of the terminals 13.

Lastly, as shown in FIG. 25C, the protective film 18 is formed so as to cover almost the entire surface of the substrate 10.

The configuration of the touch panel 4 and the manufacturing method according to Embodiment 4 of the present invention have been described above.

In the present embodiment also, similar to the touch panel 1, the planarizing film 172 is formed so as to cover the light-shielding layer 171. The planarizing film 172 is formed only in the non-sensing area P and not in the sensing area V. The terminals 13 have a two layer structure.

According to the present embodiment, like the touch panel 2, it is possible to form the lead-out electrodes 491 and 492 thick and increase reliability without increasing the thickness of the island-shaped electrodes 110 and 120 or increasing the number of patterning steps.

Embodiment 5

Figure 26:
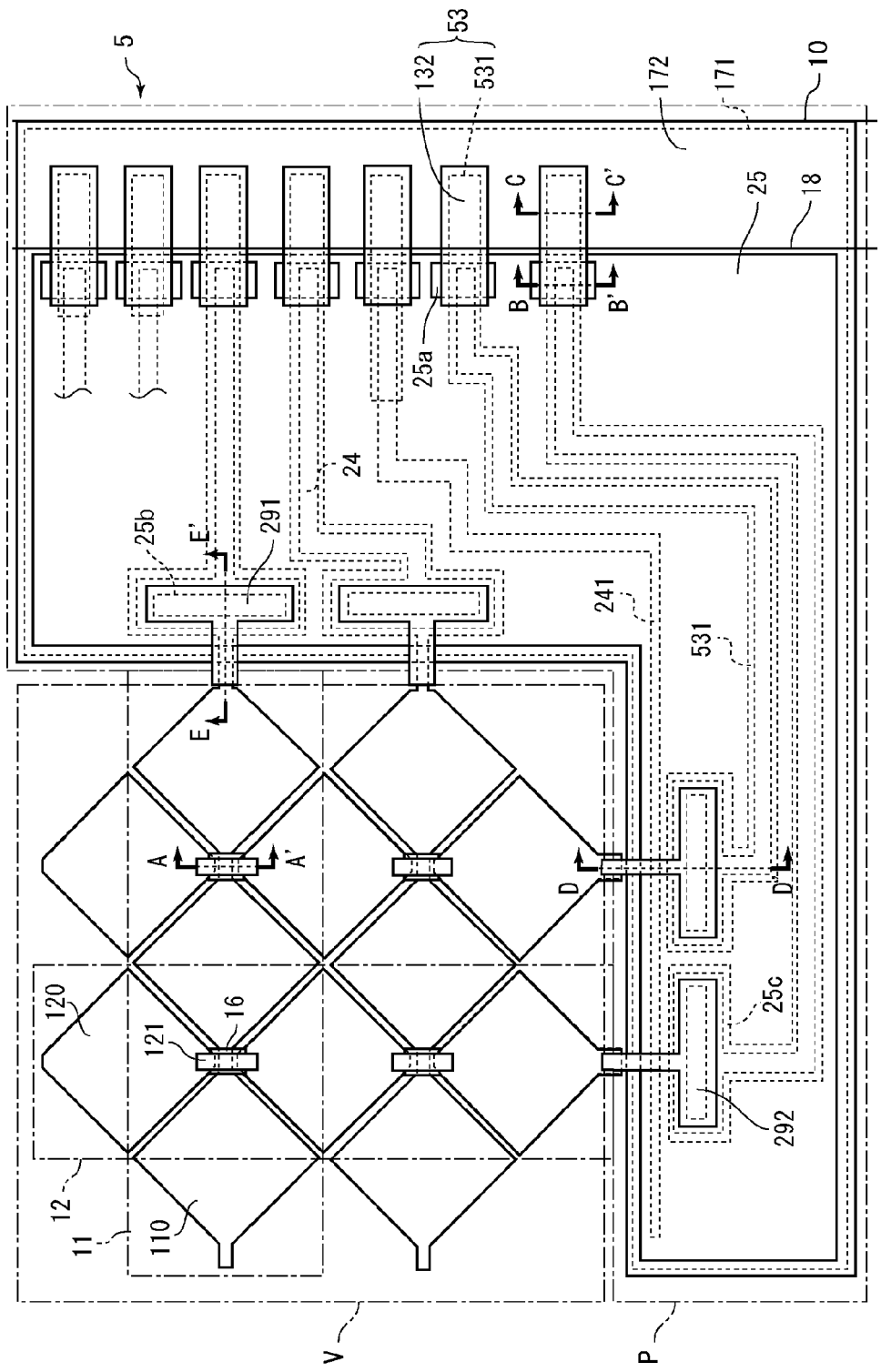
FIG. 26 is a plan view that shows a schematic configuration of a touch panel according to Embodiment 5 of the present invention.
Figure 27:
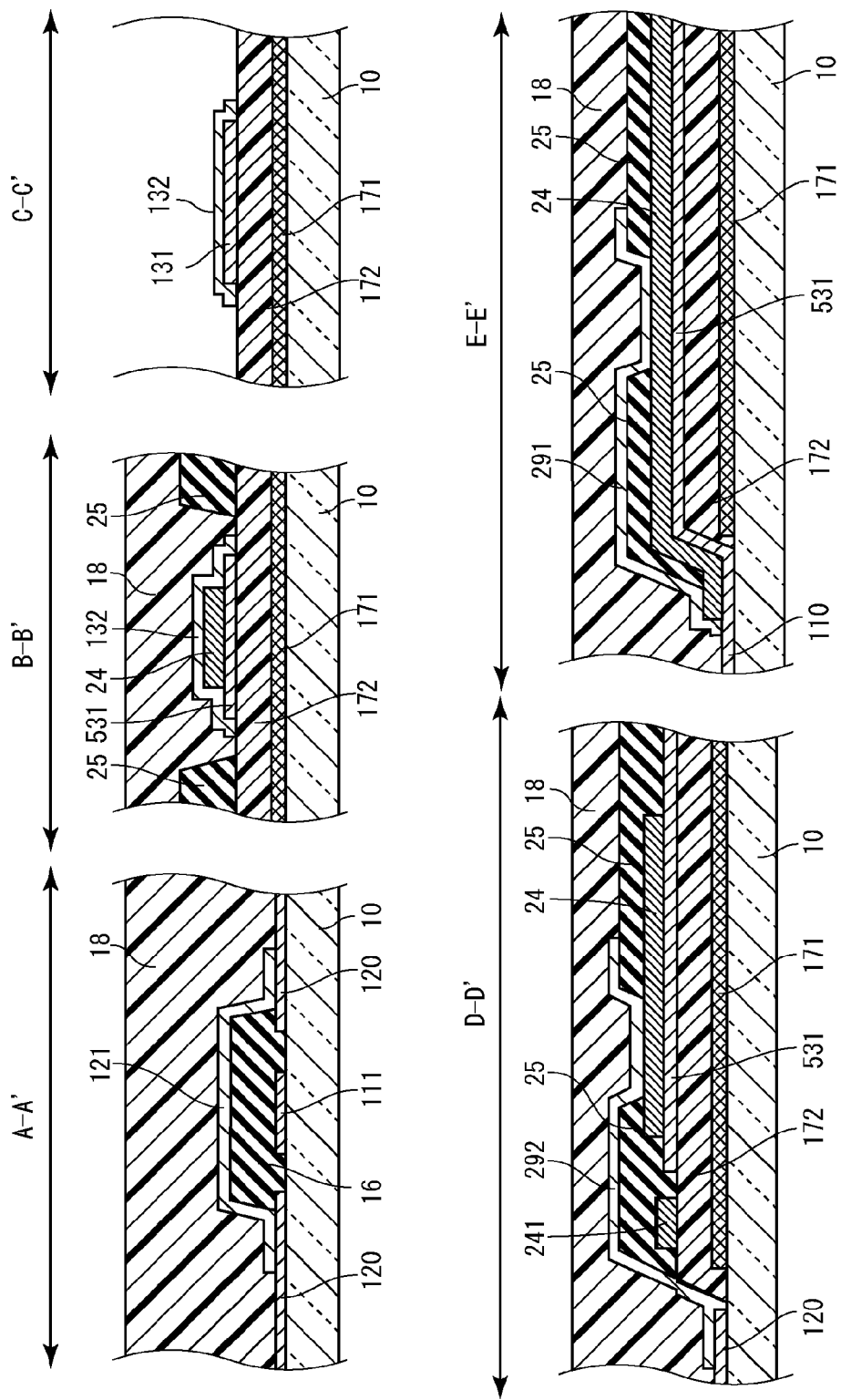
FIG. 27 shows cross-sectional views of FIG. 26 along the lines A-A', B-B', C-C', D-D', and E-E', respectively.

FIG. 26 is a plan view that schematically shows a configuration of a touch panel 5 according to Embodiment 5 of the present invention. FIG. 27 shows cross-sectional views of FIG. 26 along the lines A-A', B-B', C-C', D-D', and E-E', respectively. The touch panel 5 includes a substrate 10, X electrodes 11, Y electrodes 12, terminals 53, wiring lines 24, a ground wiring line 241, insulating films 16 and 25, a light-shielding layer 171, a planarizing film 172, and a protective film 18.

The touch panel 5 has a different configuration for the terminals compared to the touch panel 2.

The terminal 53 has a two layer structure including a lower terminal layer 531 and an upper terminal layer 132. The lower terminal layer 531 is formed so as to overlap the wiring line 24 in a plan view. Also, as shown in FIG. 27, the X electrodes 11 and the lower terminal layer 531 are formed continuously and integrally.

The method of manufacturing the touch panel 5 is almost the same as the method of manufacturing the touch panel 2. The lower terminal layer 531 simply needs to be formed instead of the lower terminal layer 131 of the touch panel 2.

According to the present embodiment, the wiring line 24 and the lower terminal layer 531 have a redundant structure. This allows resistance to be reduced. Also, conduction can be maintained even if disconnection occurs in either the wiring line 24 or the lower terminal layer 531, and thus, reliability can be improved.

According to the present embodiment, the X electrodes 11 and the wiring lines 24 are connected through the lead-out electrodes 291, and the X electrodes 11 and the lower terminal layer 531 are formed continuously and integrally, thus also forming a connection. Thus, the reliability can be improved.

Other Embodiments

The embodiments of the present invention were described above, but the present invention is not limited to the embodiments above, and various modifications are possible within the scope of the present invention. Also, the respective embodiments can be appropriately combined.

INDUSTRIAL APPLICABILITY

The present invention can be applied to the industry of touch panels and display devices equipped with touch panels.

The invention claimed is:

1. A touch panel, comprising:
    an insulating substrate having a sensing area and a non-sensing area;
    sensor electrodes formed in the sensing area of the insulating substrate;
    terminals formed in the non-sensing area of the insulating substrate;
    wiring lines that electrically connect the sensor electrodes to the terminals;
    a light-shielding layer formed in the non-sensing area; and
    a planarizing film formed over to cover the light-shielding layer, the planarizing film being formed only in the non-sensing area of the insulating substrate and having a forward taper on an edge thereof adjacent to the sensing area,
    wherein the planarizing film is disposed between the light-shielding layer and the wiring lines, the wiring lines being formed at least in the non-sensing area.

2. The touch panel according to claim 1, further comprising a first insulating film formed so as to overlap the wiring lines in a plan view.

3. The touch panel according to claim 2, wherein the wiring lines are formed in a layer below the first insulating film.

4. The touch panel according to claim 2, wherein the wiring lines are formed in a layer above the first insulating film.

5. The touch panel according to claim 2,
    wherein the sensor electrodes include a first electrode and a second electrode,
    wherein the first electrode includes a plurality of first island-shaped electrodes disposed along a first direction and a first connecting portion that connects adjacent said first island-shaped electrodes,
    wherein the second electrode includes a plurality of second island-shaped electrodes disposed along a second direction that intersects with the first direction, and a second connecting portion that connects adjacent said second island-shaped electrodes, and
    wherein said touch panel further comprises a second insulating film that insulates the first electrode from the second electrode.

6. The touch panel according to claim 5,
    wherein the second insulating film has openings, and
    wherein the second island-shaped electrodes and the second connecting portion are connected through the openings.

7. The touch panel according to claim 1, wherein the wiring lines straddle the sensing area and the non-sensing area.

8. The touch panel according to claim 5, further comprising third connecting portions that connect the sensor electrodes to the wiring lines, the third connecting portions being made of the same material as the second connecting portion.

9. The touch panel according to claim 8,
    wherein the second connecting portion is formed over the second insulating film, and
    wherein the third connecting portions are formed over the first insulating film.

10. The touch panel according to claim 8, wherein the second connecting portion and the third connecting portions are formed in the same step.

11. The touch panel according to claim 8, wherein the second connecting portion and the third connecting portions are formed so as to be thicker than the first island-shaped electrodes and the second island-shaped electrodes.

12. The touch panel according to claim 1, wherein the terminals are formed so as to overlap the wiring lines in a plan view in the non-sensing area.

13. A display device equipped with a touch panel, comprising:
    a liquid crystal display device; and
    the touch panel according to claim 1.

* * * * *